United States Patent
Yu et al.

(10) Patent No.: US 10,182,444 B2
(45) Date of Patent: Jan. 15, 2019

(54) SIGNAL TRANSMISSION METHOD, USER EQUIPMENT, AND BASE STATION

(71) Applicant: Huawei Technologies Co., Ltd., Shenzhen (CN)

(72) Inventors: Zheng Yu, Beijing (CN); Brian Classon, Palatine, IL (US); Fang Nan, Beijing (CN); Xiangdong Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 84 days.

(21) Appl. No.: 15/160,988

(22) Filed: May 20, 2016

(65) Prior Publication Data
US 2016/0270057 A1 Sep. 15, 2016

Related U.S. Application Data

(63) Continuation of application No. PCT/CN2013/087710, filed on Nov. 22, 2013.

(51) Int. Cl.
*H04W 72/04* (2009.01)
*H04W 16/18* (2009.01)
*H04W 48/18* (2009.01)

(52) U.S. Cl.
CPC ......... *H04W 72/048* (2013.01); *H04W 16/18* (2013.01); *H04W 48/18* (2013.01); *Y02D 70/00* (2018.01); *Y02D 70/1262* (2018.01); *Y02D 70/1264* (2018.01)

(58) Field of Classification Search
CPC .................................................. H04W 72/04
See application file for complete search history.

(56) References Cited

U.S. PATENT DOCUMENTS

| 5,991,627 A | 11/1999 | Honkasalo et al. |
| 6,567,459 B1 | 5/2003 | Haekkinen Hannu et al. |
| 8,989,752 B2 | 3/2015 | Zhao |

(Continued)

FOREIGN PATENT DOCUMENTS

| AU | 2012200266 A1 | 2/2012 |
| CN | 101729128 A | 6/2010 |

(Continued)

OTHER PUBLICATIONS

NSN, Nokia, "Data Channel Coverage Enhancement," 3GPP TSG RAN1#74bis, R1-134518, Guangzhou, China, Oct. 7-11, 2013, 3 pages.

(Continued)

*Primary Examiner* — Brandon M Renner
(74) *Attorney, Agent, or Firm* — Slater Matsil, LLP

(57) ABSTRACT

Embodiments of the present invention disclose a signal transmission method, user equipment, and a base station. The method includes: determining a feature parameter of UE; and according to the feature parameter of the UE and a preset correspondence, determining a coverage enhancement technology used to transmit a first signal, and/or determining a second signal that the UE supports transmitting, and/or determining a function, supported by the UE, of a third signal. The present invention can optimize resource utilization of a system, decrease processing complexity, and reduce power consumption.

12 Claims, 2 Drawing Sheets

(56) References Cited

U.S. PATENT DOCUMENTS

| | | |
|---|---|---|
| 2005/0181799 A1 | 8/2005 | Laroia et al. |
| 2007/0019583 A1 | 1/2007 | Laroia et al. |
| 2007/0149193 A1 | 6/2007 | Chong |
| 2009/0046645 A1 | 2/2009 | Bertrand et al. |
| 2010/0215034 A1 | 8/2010 | Klein et al. |
| 2010/0220623 A1 | 9/2010 | Cave et al. |
| 2012/0002616 A1 | 1/2012 | Ishii et al. |
| 2012/0083277 A1 | 4/2012 | Ishii et al. |
| 2012/0113831 A1 | 5/2012 | Pelletier et al. |
| 2013/0028214 A1* | 1/2013 | Imamura .......... H04L 5/001 370/329 |
| 2013/0051342 A1* | 2/2013 | Aiba .......... H04L 1/1893 370/329 |
| 2013/0084850 A1* | 4/2013 | Martin .......... H04W 24/10 455/423 |
| 2013/0183992 A1 | 7/2013 | Laroia et al. |
| 2013/0188580 A1 | 7/2013 | Dinan |
| 2013/0242889 A1 | 9/2013 | Khoryaev et al. |
| 2014/0362832 A1* | 12/2014 | Rudolf .......... H04L 1/1822 370/336 |
| 2016/0192333 A1* | 6/2016 | Wang .......... H04L 5/0053 370/329 |

FOREIGN PATENT DOCUMENTS

| | | |
|---|---|---|
| CN | 101771445 A | 7/2010 |
| CN | 101998418 A | 3/2011 |
| CN | 102111775 A | 6/2011 |
| CN | 102595524 A | 7/2012 |
| CN | 103959878 | 7/2014 |
| GB | 2502128 A | 11/2013 |
| WO | 2010087449 A1 | 5/2010 |
| WO | 2013112703 A2 | 8/2013 |

OTHER PUBLICATIONS

Qualcomm Incorporated, "PBCH Channel Design for MTC Coverage Enhancements," 3GPP TSG-RAN WG1 #74bis, R1-134605, Guangzhou, China, Oct. 7-11, 2013, 4 pages.

NSN, Nokia, "PUCCH UGI in Coverage Enhancement Mode," 3GPP TSG RAN1#75, R1-135574, San Francisco, USA, Nov. 11-15, 2013, 4 pages.

Motorola Mobility, "MTC Coverage Improvement for Control Channels," 3GPP TSG RAN WG1 Meeting #75, R1-135674, San Francisco, Nov. 11-15, 2013, 3 pages.

Intel Corporation, 3GPP TSG RAN WG1, Meeting #75, R1-135104, "Coverage Enhancement of PRACH for Low Cost MTC," San Francisco, USA, Nov. 11-15, 2013, Agenda item: 6.2.22.2, 8 pages.

Alcatel-Lucent, "Coverage enhancement techniques for PBCH," 3GPP TSG-RAN WG1 Meeting #74bis, Guangzhou, China, Oct. 7-11, 2013, R1-134207, 5 pages.

Ericsson, "Random access for enhanced coverage MTC UE," 3GPP TSG RAN WG1 Meeting #75, San Francisco, CA, USA, Nov. 11-15, 2013, R1-135645, 4 pages.

* cited by examiner

SIGNAL TRANSMISSION METHOD, USER EQUIPMENT, AND BASE STATION

This application is a continuation of International Application No. PCT/CN2013/087710, filed on Nov. 22, 2013, which is incorporated herein by reference in its entirety.

TECHNICAL FIELD

Embodiments of the present invention relate to the field of communications technologies, and in particular, to a signal transmission method, user equipment, and a base station.

BACKGROUND

In a Long Term Evolution (LTE) or Long Term Evolution Advanced (LTE Advanced, LTE-A) system, user equipment (UE) generally has different values of a feature parameter at different moments. Herein, the feature parameter of the UE refers to: a value or information used to measure quality of communication between the UE and a base station, and/or a value or information used to measure quality of a channel between the UE and a base station, and/or information used to reflect a service feature of the UE.

For example, when the UE communicates with the base station under a poor channel condition at a particular moment, greater coverage enhancement is required for signal transmission between the UE and the base station; in this case, more resource overheads may be used to improve reliability of service transmission. When the channel condition is good, less coverage enhancement is required for signal transmission between the UE and the base station; in this case, reliable service transmission can be performed by using fewer resource overheads. However, in the prior art, for example, when coverage enhancement is performed for signal transmission between the UE and the base station, a current coverage enhancement value is not considered; instead, a uniform coverage enhancement technology is used to perform coverage enhancement. Besides, during coverage enhancement, the UE or the base station may support transmission of same signals, and support same functions of the signals.

That is, in the prior art, when the feature parameter of the UE changes, the UE or the base station uses a uniform coverage enhancement technology to perform coverage enhancement, supports transmitting same signals, and supports same functions of the signals, which produces a large quantity of system resource overheads, results in low resource utilization, and increases complexity of service processing by the UE or the base station. Therefore, it is necessary to provide a new method to resolve the foregoing problem.

SUMMARY

Embodiments of the present invention provide a signal transmission method, user equipment, and a base station, which can optimize resource utilization of a system, decrease processing complexity, and reduce power consumption.

A first aspect of the embodiments of the present invention provides user equipment UE that includes a first determining unit, configured to determine a feature parameter of the UE, where the feature parameter of the UE refers to: a value or information used to measure communication quality of the UE, and/or a value or information used to measure channel quality of the UE, and/or information used to reflect a service feature of the UE. A first processing unit is configured to: according to the feature parameter of the UE and a preset correspondence, determine a coverage enhancement technology used by the UE to transmit a first signal, and/or determine a second signal that the UE supports transmitting, and/or determine a function, supported by the UE, of a third signal.

With reference to the first aspect of the embodiments of the present invention, in a first implementation manner of the first aspect of the embodiments of the present invention, the feature parameter of the UE includes at least one of the following: a resource, a resource index, a level, a level index, an enhancement level, an enhancement level index, a repetition level, a repetition level index, a quantity of repetition times, an index of a quantity of repetition times, a coverage enhancement value, an index of a coverage enhancement range, a path loss value, an index of a path loss range, a reference signal received power value, an index of a reference signal received power range, a reference signal received quality value, an index of a reference signal received quality range, a channel quality information value, an index of a channel quality information range, a service type, an index of a service type, a power saving requirement, an index of a power saving requirement, a delay requirement, an index of a delay requirement, a quantity of times of detecting a pre-specified channel, an index of a quantity of times of detecting a pre-specified channel, a mobility requirement, and an index of a mobility requirement.

With reference to the first aspect of the embodiments of the present invention or the first implementation manner of the first aspect, in a second implementation manner of the first aspect of the embodiments of the present invention, the first determining unit is configured to: determine the feature parameter of the UE according to received signaling that indicates the feature parameter of the UE, or determine the feature parameter of the UE according to whether a downlink signal can be correctly received, or determine the feature parameter of the UE by measuring a received downlink signal, or determine the feature parameter of the UE autonomously.

With reference to the first aspect of the embodiments of the present invention, in a third implementation manner of the first aspect of the embodiments of the present invention, the first processing unit is configured to: determine, according to a preset correspondence between a feature parameter and a coverage enhancement technology that is used to transmit the first signal, a coverage enhancement technology that is used to transmit the first signal and that corresponds to the feature parameter of the UE; and/or determine, according to a preset correspondence between a feature parameter and a second signal of which transmission is supported, a second signal to which the feature parameter of the UE corresponds, wherein transmission of the second signal is supported by the feature parameter; and/or determine, according to a preset correspondence between a feature parameter and a supported function of the third signal, a supported function that is corresponding to the feature parameter of the UE and is of the third signal.

With reference to the third implementation manner of the first aspect of the embodiments of the present invention, in a fourth implementation manner of the first aspect of the embodiments of the present invention, the preset correspondence is a preset function relationship, a preset table relationship, or a preset specification relationship, and the preset correspondence is preconfigured by a base station by using signaling or is preset by a system.

With reference to the fourth implementation manner of the first aspect of the embodiments of the present invention, in a fifth implementation manner of the first aspect of the embodiments of the present invention, the preset correspondence between a feature parameter and a coverage enhancement technology that is used to transmit the first signal is: if the feature parameter is less than or equal to a feature parameter threshold, the UE uses a first coverage enhancement technology to transmit the first signal, and if the feature parameter is greater than the feature parameter threshold, the UE uses a second coverage enhancement technology to transmit the first signal, where the first coverage enhancement technology and the second coverage enhancement technology are different technologies for improving signal transmission reliability. The preset correspondence between a feature parameter and a second signal of which transmission is supported is: if the feature parameter is less than or equal to the feature parameter threshold, the UE supports transmitting a second signal in a signal set 1, and if the feature parameter is greater than the feature parameter threshold, the UE supports transmitting a second signal in a signal set 2, where the second signal in the signal set 1 and the second signal in the signal set 2 are different. The preset correspondence between a feature parameter and a supported function of the third signal is: if the feature parameter is less than or equal to the feature parameter threshold, the UE supports using a function in a first function set of the third signal, and if the feature parameter is greater than the feature parameter threshold, the UE supports using a function in a second function set of the third signal, where the function in the first function set and the function in the second function set are not completely the same.

With reference to the fourth implementation manner of the first aspect of the embodiments of the present invention, in a sixth implementation manner of the first aspect of the embodiments of the present invention, the preset correspondence between a feature parameter and a coverage enhancement technology that is used to transmit the first signal is: if the feature parameter belongs to a first feature parameter set, the UE uses a first coverage enhancement technology to transmit the first signal, and if the feature parameter belongs to a second feature parameter set, the UE uses a second coverage enhancement technology to transmit the first signal, where the first coverage enhancement technology and the second coverage enhancement technology are different technologies for improving signal transmission reliability. The preset correspondence between a feature parameter and a second signal of which transmission is supported is: if the feature parameter belongs to the first feature parameter set, the UE supports transmitting a second signal in a signal set 1, and if the feature parameter belongs to the second feature parameter set, the UE supports transmitting a second signal in a signal set 2, where the second signal in the signal set 1 and the second signal in the signal set 2 are different. The preset correspondence between a feature parameter and a supported function of the third signal is: if the feature parameter belongs to the first feature parameter set, the UE supports a function in a first function set of the third signal, and if the feature parameter belongs to the second feature parameter set, the UE supports using a function in a second function set of the third signal, where the function in the first function set and the function in the second function set are not completely the same.

With reference to the fifth implementation manner of the first aspect of the embodiments of the present invention or the sixth implementation manner of the first aspect, in a seventh implementation manner of the first aspect of the embodiments of the present invention, one or more of the feature parameter threshold, the signal set 1, the signal set 2, the first function set, the second function set, the first feature parameter set and the second feature parameter set are preconfigured by the base station by using signaling or are preset by the system.

With reference to the first aspect of the embodiments of the present invention, in an eighth implementation manner of the first aspect of the embodiments of the present invention, the first signal, the second signal, and the third signal are the same or different.

With reference to the eighth implementation manner of the first aspect of the embodiments of the present invention, in a ninth implementation manner of the first aspect of the embodiments of the present invention, the first signal, the second signal, or the third signal includes at least one of the following: a physical downlink control channel, an enhanced physical downlink control channel, a physical random access channel, a physical control format indicator channel, a physical hybrid automatic repeat request indicator channel, a unicast physical downlink shared channel, a broadcast or multicast physical downlink shared channel, a physical uplink shared channel, a physical uplink control channel, a synchronization channel, a physical broadcast channel, a common reference signal, a demodulation reference signal, a dedicated reference signal, a random access response message, a random access response acknowledgment message, a contention resolution message, system information, and a paging message.

A second aspect of the embodiments of the present invention provides a base station, where the base station includes: a second determining unit, configured to determine a feature parameter of user equipment UE, where the feature parameter of the UE refers to: a value or information used to measure communication quality of the UE, and/or a value or information used to measure channel quality of the UE, and/or information used to reflect a service feature of the UE; and a second processing unit, configured to: according to the feature parameter of the UE and a preset correspondence, determine a coverage enhancement technology used by the base station to transmit a first signal, and/or determine a second signal that the base station supports transmitting, and/or determine a function, supported by the base station, of a third signal.

With reference to the second aspect of the embodiments of the present invention, in a first implementation manner of the second aspect of the embodiments of the present invention, the feature parameter of the UE includes at least one of the following: a resource, a resource index, a level, a level index, an enhancement level, an enhancement level index, a repetition level, a repetition level index, a quantity of repetition times, an index of a quantity of repetition times, a coverage enhancement value, an index of a coverage enhancement range, a path loss value, an index of a path loss range, a reference signal received power value, an index of a reference signal received power range, a reference signal received quality value, an index of a reference signal received quality range, a channel quality information value, an index of a channel quality information range, a service type, an index of a service type, a power saving requirement, an index of a power saving requirement, a delay requirement, an index of a delay requirement, a quantity of times of detecting a pre-specified channel, an index of a quantity of times of detecting a pre-specified channel, a mobility requirement, and an index of a mobility requirement.

With reference to the second aspect of the embodiments of the present invention or the first implementation manner of the second aspect, in a second implementation manner of the second aspect of the embodiments of the present invention, the second determining unit is configured to: determine the feature parameter of the UE according to received signaling that indicates the feature parameter of the UE, or determine the feature parameter of the UE according to whether an uplink signal can be correctly received, or determine the feature parameter of the UE by measuring a received uplink signal, or determine the feature parameter of the UE autonomously.

With reference to the second aspect of the embodiments of the present invention, in a third implementation manner of the second aspect of the embodiments of the present invention, the second processing unit is configured to: determine, according to a preset correspondence between a feature parameter and a coverage enhancement technology that is used to transmit the first signal, a coverage enhancement technology that is used to transmit the first signal and that corresponds to the feature parameter of the UE; and/or determine, according to a preset correspondence between a feature parameter and a second signal of which transmission is supported, a second signal to which the feature parameter of the UE corresponds, wherein transmission of the second signal is supported by the feature parameter; and/or determine, according to a preset correspondence between a feature parameter and a supported function of the third signal, a supported function that is corresponding to the feature parameter of the UE and is of the third signal.

With reference to the third implementation manner of the second aspect of the embodiments of the present invention, in a fourth implementation manner of the second aspect of the embodiments of the present invention, the preset correspondence is a preset function relationship, a preset table relationship, or a preset specification relationship, and the preset correspondence is preconfigured by the base station by using signaling or is preset by a system.

With reference to the fourth implementation manner of the second aspect of the embodiments of the present invention, in a fifth implementation manner of the second aspect of the embodiments of the present invention, the preset correspondence between a feature parameter and a coverage enhancement technology that is used to transmit the first signal is: if the feature parameter is less than or equal to a feature parameter threshold, the base station uses a first coverage enhancement technology to transmit the first signal, and if the feature parameter is greater than the feature parameter threshold, the base station uses a second coverage enhancement technology to transmit the first signal, where the first coverage enhancement technology and the second coverage enhancement technology are different technologies for improving signal transmission reliability; the preset correspondence between a feature parameter and a second signal of which transmission is supported is: if the feature parameter is less than or equal to the feature parameter threshold, the base station supports transmitting a second signal in a signal set 1, and if the feature parameter is greater than the feature parameter threshold, the base station supports transmitting a second signal in a signal set 2, where the second signal in the signal set 1 and the second signal in the signal set 2 are different; and the preset correspondence between a feature parameter and a supported function of the third signal is: if the feature parameter is less than or equal to the feature parameter threshold, the base station supports using a function in a first function set of the third signal, and if the feature parameter is greater than the feature parameter threshold, the base station supports using a function in a second function set of the third signal, where the function in the first function set and the function in the second function set are not completely the same.

With reference to the fourth implementation manner of the second aspect of the embodiments of the present invention, in a sixth implementation manner of the second aspect of the embodiments of the present invention, the preset correspondence between a feature parameter and a coverage enhancement technology that is used to transmit the first signal is: if the feature parameter belongs to a first feature parameter set, the base station uses a first coverage enhancement technology to transmit the first signal, and if the feature parameter belongs to a second feature parameter set, the base station uses a second coverage enhancement technology to transmit the first signal, where the first coverage enhancement technology and the second coverage enhancement technology are different technologies for improving signal transmission reliability; the preset correspondence between a feature parameter and a second signal of which transmission is supported is: if the feature parameter belongs to the first feature parameter set, the base station supports transmitting a second signal in a signal set 1, and if the feature parameter belongs to the second feature parameter set, the base station supports transmitting a second signal in a signal set 2, where the second signal in the signal set 1 and the second signal in the signal set 2 are different; and the preset correspondence between a feature parameter and a supported function of the third signal is: if the feature parameter belongs to the first feature parameter set, the base station supports a function in a first function set of the third signal, and if the feature parameter belongs to the second feature parameter set, the base station supports using a function in a second function set of the third signal, where the function in the first function set and the function in the second function set are not completely the same.

With reference to the fifth implementation manner of the second aspect of the embodiments of the present invention or the sixth implementation manner of the second aspect, in a seventh implementation manner of the second aspect of the embodiments of the present invention, one or more of the feature parameter threshold, the signal set 1, the signal set 2, the first function set, the second function set, the first feature parameter set and the second feature parameter set are preconfigured by the base station by using signaling or are preset by the system.

With reference to the second aspect of the embodiments of the present invention, in an eighth implementation manner of the second aspect of the embodiments of the present invention, the first signal, the second signal, and the third signal are the same or different.

With reference to the eighth implementation manner of the second aspect of the embodiments of the present invention, in a ninth implementation manner of the second aspect of the embodiments of the present invention, the first signal, the second signal, or the third signal includes at least one of the following: a physical downlink control channel, an enhanced physical downlink control channel, a physical random access channel, a physical control format indicator channel, a physical hybrid automatic repeat request indicator channel, a unicast physical downlink shared channel, a broadcast or multicast physical downlink shared channel, a physical uplink shared channel, a physical uplink control channel, a synchronization channel, a physical broadcast channel, a common reference signal, a demodulation reference signal, a dedicated reference signal, a random access response message, a random access response acknowledgment message, a contention resolution message, system information, and a paging message.

A third aspect of the embodiments of the present invention provides UE that includes: a first memory, configured to store a preset correspondence; and a first processor, configured to determine a feature parameter of the UE, where the feature parameter of the UE refers to: a value or information used to measure communication quality of the UE, and/or a value or information used to measure channel quality of the UE, and/or information used to reflect a service feature of the UE; and according to the feature parameter of the UE and the preset correspondence, determine a coverage enhancement technology used by the UE to transmit a first signal, and/or determine a second signal that the UE supports transmitting, and/or determine a function, supported by the UE, of a third signal.

With reference to the third aspect of the embodiments of the present invention, in a first implementation manner of the third aspect of the embodiments of the present invention, the feature parameter of the UE includes at least one of the following: a resource, a resource index, a level, a level index, an enhancement level, an enhancement level index, a repetition level, a repetition level index, a quantity of repetition times, an index of a quantity of repetition times, a coverage enhancement value, an index of a coverage enhancement range, a path loss value, an index of a path loss range, a reference signal received power value, an index of a reference signal received power range, a reference signal received quality value, an index of a reference signal received quality range, a channel quality information value, an index of a channel quality information range, a service type, an index of a service type, a power saving requirement, an index of a power saving requirement, a delay requirement, an index of a delay requirement, a quantity of times of detecting a pre-specified channel, an index of a quantity of times of detecting a pre-specified channel, a mobility requirement, and an index of a mobility requirement.

With reference to the third aspect of the embodiments of the present invention or the first implementation manner of the third aspect, in a second implementation manner of the third aspect of the embodiments of the present invention, the first processor is configured to: determine the feature parameter of the UE according to received signaling that indicates the feature parameter of the UE, or determine the feature parameter of the UE according to whether a downlink signal can be correctly received, or determine the feature parameter of the UE by measuring a received downlink signal, or determine the feature parameter of the UE autonomously.

With reference to the third aspect of the embodiments of the present invention, in a third implementation manner of the third aspect of the embodiments of the present invention, the first processor is configured to: determine, according to a preset correspondence between a feature parameter and a coverage enhancement technology that is used to transmit the first signal, a coverage enhancement technology that is used to transmit the first signal and that corresponds to the feature parameter of the UE; and/or determine, according to a preset correspondence between a feature parameter and a second signal of which transmission is supported, a second signal to which the feature parameter of the UE corresponds, wherein transmission of the second signal is supported by the feature parameter; and/or determine, according to a preset correspondence between a feature parameter and a supported function of the third signal, a supported function that is corresponding to the feature parameter of the UE and is of the third signal.

With reference to the third implementation manner of the third aspect of the embodiments of the present invention, in a fourth implementation manner of the third aspect of the embodiments of the present invention, the preset correspondence is a preset function relationship, a preset table relationship, or a preset specification relationship, and the preset correspondence is preconfigured by a base station by using signaling or is preset by a system.

With reference to the fourth implementation manner of the third aspect of the embodiments of the present invention, in a fifth implementation manner of the third aspect of the embodiments of the present invention, the preset correspondence between a feature parameter and a coverage enhancement technology that is used to transmit the first signal is: if the feature parameter is less than or equal to a feature parameter threshold, the UE uses a first coverage enhancement technology to transmit the first signal, and if the feature parameter is greater than the feature parameter threshold, the UE uses a second coverage enhancement technology to transmit the first signal, where the first coverage enhancement technology and the second coverage enhancement technology are different technologies for improving signal transmission reliability; the preset correspondence between a feature parameter and a second signal of which transmission is supported is: if the feature parameter is less than or equal to the feature parameter threshold, the UE supports transmitting a second signal in a signal set 1, and if the feature parameter is greater than the feature parameter threshold, the UE supports transmitting a second signal in a signal set 2, where the second signal in the signal set 1 and the second signal in the signal set 2 are different; and the preset correspondence between a feature parameter and a supported function of the third signal is: if the feature parameter is less than or equal to the feature parameter threshold, the UE supports using a function in a first function set of the third signal, and if the feature parameter is greater than the feature parameter threshold, the UE supports using a function in a second function set of the third signal, where the function in the first function set and the function in the second function set are not completely the same.

With reference to the fourth implementation manner of the third aspect of the embodiments of the present invention, in a sixth implementation manner of the third aspect of the embodiments of the present invention, the preset correspondence between a feature parameter and a coverage enhancement technology that is used to transmit the first signal is: if the feature parameter belongs to a first feature parameter set, the UE uses a first coverage enhancement technology to transmit the first signal, and if the feature parameter belongs to a second feature parameter set, the UE uses a second coverage enhancement technology to transmit the first signal, where the first coverage enhancement technology and the second coverage enhancement technology are different technologies for improving signal transmission reliability; the preset correspondence between a feature parameter and a second signal of which transmission is supported is: if the feature parameter belongs to the first feature parameter set, the UE supports transmitting a second signal in a signal set 1, and if the feature parameter belongs to the second feature parameter set, the UE supports transmitting a second signal in a signal set 2, where the second signal in the signal set 1 and the second signal in the signal set 2 are different; and the preset correspondence between a feature parameter and a supported function of the third signal is: if the feature parameter belongs to the first feature parameter set, the UE supports a function in a first function set of the third signal, and if the feature parameter belongs to the second feature parameter set, the UE supports using a function in a second function set of the third signal, where the function in the first function set and the function in the second function set are not completely the same.

With reference to the fifth implementation manner of the third aspect of the embodiments of the present invention or the sixth implementation manner of the third aspect, in a seventh implementation manner of the third aspect of the embodiments of the present invention, one or more of the feature parameter threshold, the signal set 1, the signal set 2, the first function set, the second function set, the first feature parameter set and the second feature parameter set are preconfigured by the base station by using signaling or are preset by the system.

With reference to the third aspect of the embodiments of the present invention, in an eighth implementation manner of the third aspect of the embodiments of the present invention, the first signal, the second signal, and the third signal are the same or different.

With reference to the eighth implementation manner of the third aspect of the embodiments of the present invention, in a ninth implementation manner of the third aspect of the embodiments of the present invention, the first signal, the second signal, or the third signal includes at least one of the following: a physical downlink control channel, an enhanced physical downlink control channel, a physical random access channel, a physical control format indicator channel, a physical hybrid automatic repeat request indicator channel, a unicast physical downlink shared channel, a broadcast or multicast physical downlink shared channel, a physical uplink shared channel, a physical uplink control channel, a synchronization channel, a physical broadcast channel, a common reference signal, a demodulation reference signal, a dedicated reference signal, a random access response message, a random access response acknowledgment message, a contention resolution message, system information, and a paging message.

A fourth aspect of the embodiments of the present invention provides a base station that includes: a second memory, configured to store a preset correspondence; and a second processor, configured to determine a feature parameter of user equipment UE, where the feature parameter of the UE refers to: a value or information used to measure communication quality of the UE, and/or a value or information used to measure channel quality of the UE, and/or information used to reflect a service feature of the UE; and according to the feature parameter of the UE and the preset correspondence, determine a coverage enhancement technology used by the base station to transmit a first signal, and/or determine a second signal that the base station supports transmitting, and/or determine a function, supported by the base station, of a third signal.

With reference to the fourth aspect of the embodiments of the present invention, in a first implementation manner of the fourth aspect of the embodiments of the present invention, the feature parameter of the UE includes at least one of the following: a resource, a resource index, a level, a level index, an enhancement level, an enhancement level index, a repetition level, a repetition level index, a quantity of repetition times, an index of a quantity of repetition times, a coverage enhancement value, an index of a coverage enhancement range, a path loss value, an index of a path loss range, a reference signal received power value, an index of a reference signal received power range, a reference signal received quality value, an index of a reference signal received quality range, a channel quality information value, an index of a channel quality information range, a service type, an index of a service type, a power saving requirement, an index of a power saving requirement, a delay requirement, an index of a delay requirement, a quantity of times of detecting a pre-specified channel, an index of a quantity of times of detecting a pre-specified channel, a mobility requirement, and an index of a mobility requirement.

With reference to the fourth aspect of the embodiments of the present invention or the first implementation manner of the fourth aspect, in a second implementation manner of the fourth aspect of the embodiments of the present invention, the second processor is configured to: determine the feature parameter of the UE according to received signaling that indicates the feature parameter of the UE, or determine the feature parameter of the UE according to whether an uplink signal can be correctly received, or determine the feature parameter of the UE by measuring a received downlink signal, or determine the feature parameter of the UE autonomously.

With reference to the fourth aspect of the embodiments of the present invention, in a third implementation manner of the fourth aspect of the embodiments of the present invention, the second processor is configured to: determine, according to a preset correspondence between a feature parameter and a coverage enhancement technology that is used to transmit the first signal, a coverage enhancement technology that is used to transmit the first signal and that corresponds to the feature parameter of the UE; and/or determine, according to a preset correspondence between a feature parameter and a second signal of which transmission is supported, a second signal to which the feature parameter of the UE corresponds, wherein transmission of the second signal is supported by the feature parameter; and/or determine, according to a preset correspondence between a feature parameter and a supported function of the third signal, a supported function that is corresponding to the feature parameter of the UE and is of the third signal.

With reference to the third implementation manner of the fourth aspect of the embodiments of the present invention, in a fourth implementation manner of the fourth aspect of the embodiments of the present invention, the preset correspondence is a preset function relationship, a preset table relationship, or a preset specification relationship, and the preset correspondence is preconfigured by the base station by using signaling or is preset by a system.

With reference to the fourth implementation manner of the fourth aspect of the embodiments of the present invention, in a fifth implementation manner of the fourth aspect of the embodiments of the present invention, the preset correspondence between a feature parameter and a coverage enhancement technology that is used to transmit the first signal is: if the feature parameter is less than or equal to a feature parameter threshold, the base station uses a first coverage enhancement technology to transmit the first signal, and if the feature parameter is greater than the feature parameter threshold, the base station uses a second coverage enhancement technology to transmit the first signal, where the first coverage enhancement technology and the second coverage enhancement technology are different technologies for improving signal transmission reliability; the preset correspondence between a feature parameter and a second signal of which transmission is supported is: if the feature parameter is less than or equal to the feature parameter threshold, the base station supports transmitting a second signal in a signal set 1, and if the feature parameter is greater than the feature parameter threshold, the base station supports transmitting a second signal in a signal set 2, where the second signal in the signal set 1 and the second signal in the signal set 2 are different; and the preset correspondence between a feature parameter and a supported function of the third signal is: if the feature parameter is less than or equal to the feature parameter threshold, the base station supports using a function in a first function set of the third signal, and if the feature parameter is greater than the feature parameter threshold, the base station supports using a function in a second function set of the third signal, where the function in the first function set and the function in the second function set are not completely the same.

With reference to the fourth implementation manner of the fourth aspect of the embodiments of the present invention, in a sixth implementation manner of the fourth aspect of the embodiments of the present invention, the preset correspondence between a feature parameter and a coverage enhancement technology that is used to transmit the first signal is: if the feature parameter belongs to a first feature parameter set, the base station uses a first coverage enhancement technology to transmit the first signal, and if the feature parameter belongs to a second feature parameter set, the base station uses a second coverage enhancement technology to transmit the first signal, where the first coverage enhancement technology and the second coverage enhancement technology are different technologies for improving signal transmission reliability; the preset correspondence between a feature parameter and a second signal of which transmission is supported is: if the feature parameter belongs to the first feature parameter set, the base station supports transmitting a second signal in a signal set 1, and if the feature parameter belongs to the second feature parameter set, the base station supports transmitting a second signal in a signal set 2, where the second signal in the signal set 1 and the second signal in the signal set 2 are different; and the preset correspondence between a feature parameter and a supported function of the third signal is: if the feature parameter belongs to the first feature parameter set, the base station supports a function in a first function set of the third signal, and if the feature parameter belongs to the second feature parameter set, the base station supports using a function in a second function set of the third signal, where the function in the first function set and the function in the second function set are not completely the same.

With reference to the fifth implementation manner of the fourth aspect of the embodiments of the present invention or the sixth implementation manner of the fourth aspect, in a seventh implementation manner of the fourth aspect of the embodiments of the present invention, one or more of the feature parameter threshold, the signal set 1, the signal set 2, the first function set, the second function set, the first feature parameter set and the second feature parameter set are preconfigured by the base station by using signaling or are preset by the system.

With reference to the fourth aspect of the embodiments of the present invention, in an eighth implementation manner of the fourth aspect of the embodiments of the present invention, the first signal, the second signal, and the third signal are the same or different.

With reference to the eighth implementation manner of the fourth aspect of the embodiments of the present invention, in a ninth implementation manner of the fourth aspect of the embodiments of the present invention, the first signal, the second signal, or the third signal includes at least one of the following: a physical downlink control channel, an enhanced physical downlink control channel, a physical random access channel, a physical control format indicator channel, a physical hybrid automatic repeat request indicator channel, a unicast physical downlink shared channel, a broadcast or multicast physical downlink shared channel, a physical uplink shared channel, a physical uplink control channel, a synchronization channel, a physical broadcast channel, a common reference signal, a demodulation reference signal, a dedicated reference signal, a random access response message, a random access response acknowledgment message, a contention resolution message, system information, and a paging message.

A fifth aspect of the embodiments of the present invention provides a signal transmission method, including: determining, by user equipment UE, a feature parameter of the UE, where the feature parameter of the UE refers to: a value or information used to measure communication quality of the UE, and/or a value or information used to measure channel quality of the UE, and/or information used to reflect a service feature of the UE. The method further includes, according to the feature parameter of the UE and a preset correspondence, determining, by the UE, a coverage enhancement technology used by the UE to transmit a first signal, and/or determining a second signal that the UE supports transmitting, and/or determining a function, supported by the UE, of a third signal.

With reference to the fifth aspect of the embodiments of the present invention, in a first implementation manner of the fifth aspect of the embodiments of the present invention, the feature parameter of the UE includes at least one of the following: a resource, a resource index, a level, a level index, an enhancement level, an enhancement level index, a repetition level, a repetition level index, a quantity of repetition times, an index of a quantity of repetition times, a coverage enhancement value, an index of a coverage enhancement range, a path loss value, an index of a path loss range, a reference signal received power value, an index of a reference signal received power range, a reference signal received quality value, an index of a reference signal received quality range, a channel quality information value, an index of a channel quality information range, a service type, an index of a service type, a power saving requirement, an index of a power saving requirement, a delay requirement, an index of a delay requirement, a quantity of times of detecting a pre-specified channel, an index of a quantity of times of detecting a pre-specified channel, a mobility requirement, and an index of a mobility requirement.

With reference to the fifth aspect of the embodiments of the present invention or the first implementation manner of the fifth aspect, in a second implementation manner of the fifth aspect of the embodiments of the present invention, a method for determining, by the UE, the feature parameter of the UE is: determining, by the UE, the feature parameter of the UE according to received signaling that indicates the feature parameter of the UE, or determining, by the UE, the feature parameter of the UE according to whether a downlink signal can be correctly received, or determining, by the UE, the feature parameter of the UE by measuring a received downlink signal, or determining, by the UE, the feature parameter of the UE autonomously.

With reference to the fifth aspect of the embodiments of the present invention, in a third implementation manner of the fifth aspect of the embodiments of the present invention, a method for determining, by the UE according to the feature parameter of the UE and the preset correspondence, the coverage enhancement technology used by the UE to transmit the first signal, and/or determining the second signal that the UE supports transmitting, and/or determining the function, supported by the UE, of the third signal is: determining, by the UE according to a preset correspondence between a feature parameter and a coverage enhancement technology that is used to transmit the first signal, a coverage enhancement technology that is used to transmit the first signal and that corresponds to the feature parameter of the UE; and/or determining, by the UE according to a preset correspondence between a feature parameter and a second signal of which transmission is supported, a second signal to which the feature parameter of the UE corresponds, wherein transmission of the second signal is supported by the feature parameter; and/or determining, by the UE according to a preset correspondence between a feature parameter and a supported function of the third signal, a supported function that is corresponding to the feature parameter of the UE and is of the third signal.

With reference to the third implementation manner of the fifth aspect of the embodiments of the present invention, in a fourth implementation manner of the fifth aspect of the embodiments of the present invention, the preset correspondence is a preset function relationship, a preset table relationship, or a preset specification relationship, and the preset correspondence is preconfigured by a base station by using signaling or is preset by a system.

With reference to the fourth implementation manner of the fifth aspect of the embodiments of the present invention, in a fifth implementation manner of the fifth aspect of the embodiments of the present invention, the preset correspondence between a feature parameter and a coverage enhancement technology that is used to transmit the first signal is: if the feature parameter is less than or equal to a feature parameter threshold, the UE uses a first coverage enhancement technology to transmit the first signal, and if the feature parameter is greater than the feature parameter threshold, the UE uses a second coverage enhancement technology to transmit the first signal, where the first coverage enhancement technology and the second coverage enhancement technology are different technologies for improving signal transmission reliability; the preset correspondence between a feature parameter and a second signal of which transmission is supported is: if the feature parameter is less than or equal to the feature parameter threshold, the UE supports transmitting a second signal in a signal set 1, and if the feature parameter is greater than the feature parameter threshold, the UE supports transmitting a second signal in a signal set 2, where the second signal in the signal set 1 and the second signal in the signal set 2 are different; and the preset correspondence between a feature parameter and a supported function of the third signal is: if the feature parameter is less than or equal to the feature parameter threshold, the UE supports using a function in a first function set of the third signal, and if the feature parameter is greater than the feature parameter threshold, the UE supports using a function in a second function set of the third signal, where the function in the first function set and the function in the second function set are not completely the same.

With reference to the fourth implementation manner of the fifth aspect of the embodiments of the present invention, in a sixth implementation manner of the fifth aspect of the embodiments of the present invention, the preset correspondence between a feature parameter and a coverage enhancement technology that is used to transmit the first signal is: if the feature parameter belongs to a first feature parameter set, the UE uses a first coverage enhancement technology to transmit the first signal, and if the feature parameter belongs to a second feature parameter set, the UE uses a second coverage enhancement technology to transmit the first signal, where the first coverage enhancement technology and the second coverage enhancement technology are different technologies for improving signal transmission reliability; the preset correspondence between a feature parameter and a second signal of which transmission is supported is: if the feature parameter belongs to the first feature parameter set, the UE supports transmitting a second signal in a signal set 1, and if the feature parameter belongs to the second feature parameter set, the UE supports transmitting a second signal in a signal set 2, where the second signal in the signal set 1 and the second signal in the signal set 2 are different; and the preset correspondence between a feature parameter and a supported function of the third signal is: if the feature parameter belongs to the first feature parameter set, the UE supports a function in a first function set of the third signal, and if the feature parameter belongs to the second feature parameter set, the UE supports using a function in a second function set of the third signal, where the function in the first function set and the function in the second function set are not completely the same.

With reference to the fifth implementation manner of the fifth aspect of the embodiments of the present invention or the sixth implementation manner of the fifth aspect, in a seventh implementation manner of the fifth aspect of the embodiments of the present invention, one or more of the feature parameter threshold, the signal set 1, the signal set 2, the first function set, the second function set, the first feature parameter set and the second feature parameter set are preconfigured by the base station by using signaling or are preset by the system.

With reference to the fifth aspect of the embodiments of the present invention, in an eighth implementation manner of the fifth aspect of the embodiments of the present invention, the first signal, the second signal, and the third signal are the same or different.

With reference to the eighth implementation manner of the fifth aspect of the embodiments of the present invention, in a ninth implementation manner of the fifth aspect of the embodiments of the present invention, the first signal, the second signal, or the third signal includes at least one of the following: a physical downlink control channel, an enhanced physical downlink control channel, a physical random access channel, a physical control format indicator channel, a physical hybrid automatic repeat request indicator channel, a unicast physical downlink shared channel, a broadcast or multicast physical downlink shared channel, a physical uplink shared channel, a physical uplink control channel, a synchronization channel, a physical broadcast channel, a common reference signal, a demodulation reference signal, a dedicated reference signal, a random access response message, a random access response acknowledgment message, a contention resolution message, system information, and a paging message.

A sixth aspect of the embodiments of the present invention provides a signal transmission method, including: determining, by a base station, a feature parameter of user equipment UE, where the feature parameter of the UE refers to: a value or information used to measure communication quality of the UE, and/or a value or information used to measure channel quality of the UE, and/or information used to reflect a service feature of the UE; and according to the feature parameter of the UE and a preset correspondence, determining, by the base station, a coverage enhancement technology used by the base station to transmit a first signal, and/or determining a second signal that the base station supports transmitting, and/or determining a function, supported by the base station, of a third signal.

With reference to the sixth aspect of the embodiments of the present invention, in a first implementation manner of the sixth aspect of the embodiments of the present invention, the feature parameter of the UE includes at least one of the following: a resource, a resource index, a level, a level index, an enhancement level, an enhancement level index, a repetition level, a repetition level index, a quantity of repetition times, an index of a quantity of repetition times, a coverage enhancement value, an index of a coverage enhancement range, a path loss value, an index of a path loss range, a reference signal received power value, an index of a reference signal received power range, a reference signal received quality value, an index of a reference signal received quality range, a channel quality information value, an index of a channel quality information range, a service type, an index of a service type, a power saving requirement, an index of a power saving requirement, a delay requirement, an index of a delay requirement, a quantity of times of detecting a pre-specified channel, an index of a quantity of times of detecting a pre-specified channel, a mobility requirement, and an index of a mobility requirement.

With reference to the sixth aspect of the embodiments of the present invention or the first implementation manner of the sixth aspect, in a second implementation manner of the sixth aspect of the embodiments of the present invention, a method for determining, by the base station, the feature parameter of the UE is: determining, by the base station, the feature parameter of the UE according to received signaling that indicates the feature parameter of the UE, or determining, by the base station, the feature parameter of the UE according to whether an uplink signal can be correctly received, or determining, by the base station, the feature parameter of the UE by measuring a received uplink signal, or determining, by the base station, the feature parameter of the UE autonomously.

With reference to the sixth aspect of the embodiments of the present invention, in a third implementation manner of the sixth aspect of the embodiments of the present invention, a method for determining, by the base station according to the feature parameter of the UE and the preset correspondence, the coverage enhancement technology used by the base station to transmit the first signal, and/or determining the second signal that the base station supports transmitting, and/or determining the function, supported by the base station, of the third signal is: determining, by the base station according to a preset correspondence between a feature parameter and a coverage enhancement technology that is used to transmit the first signal, a coverage enhancement technology that is used to transmit the first signal and that corresponds to the feature parameter of the UE; and/or determining, by the base station according to a preset correspondence between a feature parameter and a second signal of which transmission is supported, a second signal to which the feature parameter of the UE corresponds, wherein transmission of the second signal is supported by the feature parameter; and/or determining, by the base station according to a preset correspondence between a feature parameter and a supported function of the third signal, a supported function that is corresponding to the feature parameter of the UE and is of the third signal.

With reference to the third implementation manner of the sixth aspect of the embodiments of the present invention, in a fourth implementation manner of the sixth aspect of the embodiments of the present invention, the preset correspondence is a preset function relationship, a preset table relationship, or a preset specification relationship, and the preset correspondence is preconfigured by the base station by using signaling or is preset by a system.

With reference to the fourth implementation manner of the sixth aspect of the embodiments of the present invention, in a fifth implementation manner of the sixth aspect of the embodiments of the present invention, the preset correspondence between a feature parameter and a coverage enhancement technology that is used to transmit the first signal is: if the feature parameter is less than or equal to a feature parameter threshold, the base station uses a first coverage enhancement technology to transmit the first signal, and if the feature parameter is greater than the feature parameter threshold, the base station uses a second coverage enhancement technology to transmit the first signal, where the first coverage enhancement technology and the second coverage enhancement technology are different technologies for improving signal transmission reliability; the preset correspondence between a feature parameter and a second signal of which transmission is supported is: if the feature parameter is less than or equal to the feature parameter threshold, the base station supports transmitting a second signal in a signal set 1, and if the feature parameter is greater than the feature parameter threshold, the base station supports transmitting a second signal in a signal set 2, where the second signal in the signal set 1 and the second signal in the signal set 2 are different; and the preset correspondence between a feature parameter and a supported function of the third signal is: if the feature parameter is less than or equal to the feature parameter threshold, the base station supports using a function in a first function set of the third signal, and if the feature parameter is greater than the feature parameter threshold, the base station supports using a function in a second function set of the third signal, where the function in the first function set and the function in the second function set are not completely the same.

With reference to the fourth implementation manner of the sixth aspect of the embodiments of the present invention, in a sixth implementation manner of the sixth aspect of the embodiments of the present invention, the preset correspondence between a feature parameter and a coverage enhancement technology that is used to transmit the first signal is: if the feature parameter belongs to a first feature parameter set, the base station uses a first coverage enhancement technology to transmit the first signal, and if the feature parameter belongs to a second feature parameter set, the base station uses a second coverage enhancement technology to transmit the first signal, where the first coverage enhancement technology and the second coverage enhancement technology are different technologies for improving signal transmission reliability; the preset correspondence between a feature parameter and a second signal of which transmission is supported is: if the feature parameter belongs to the first feature parameter set, the base station supports transmitting a second signal in a signal set 1, and if the feature parameter belongs to the second feature parameter set, the base station supports transmitting a second signal in a signal set 2, where the second signal in the signal set 1 and the second signal in the signal set 2 are different; and the preset correspondence between a feature parameter and a supported function of the third signal is: if the feature parameter belongs to the first feature parameter set, the base station supports a function in a first function set of the third signal, and if the feature parameter belongs to the second feature parameter set, the base station supports using a function in a second function set of the third signal, where the function in the first function set and the function in the second function set are not completely the same.

With reference to the fifth implementation manner of the sixth aspect of the embodiments of the present invention or the sixth implementation manner of the sixth aspect, in a seventh implementation manner of the sixth aspect of the embodiments of the present invention, one or more of the feature parameter threshold, the signal set 1, the signal set 2, the first function set, the second function set, the first feature parameter set and the second feature parameter set are preconfigured by the base station by using signaling or are preset by the system.

With reference to the sixth aspect of the embodiments of the present invention, in an eighth implementation manner of the sixth aspect of the embodiments of the present invention, the first signal, the second signal, and the third signal are the same or different.

With reference to the eighth implementation manner of the sixth aspect of the embodiments of the present invention, in a ninth implementation manner of the sixth aspect of the embodiments of the present invention, the first signal, the second signal, or the third signal includes at least one of the following: a physical downlink control channel, an enhanced physical downlink control channel, a physical random access channel, a physical control format indicator channel, a physical hybrid automatic repeat request indicator channel, a unicast physical downlink shared channel, a broadcast or multicast physical downlink shared channel, a physical uplink shared channel, a physical uplink control channel, a synchronization channel, a physical broadcast channel, a common reference signal, a demodulation reference signal, a dedicated reference signal, a random access response message, a random access response acknowledgment message, a contention resolution message, system information, and a paging message.

It can be seen from the foregoing technical solutions that the embodiments of the present invention have the following advantages.

In the embodiments of the present invention, according to a determined feature parameter of UE and a preset correspondence, the UE can determine a coverage enhancement technology used to transmit a first signal, and/or determine a second signal of which transmission is supported, and/or determine a supported function of a third signal. That is, according to a current feature parameter of the UE and a preset correspondence, the UE can adaptively determine a coverage enhancement technology used to transmit a first signal, and/or determine a second signal of which transmission is supported, and/or determine a supported function of a third signal, thereby adapting to different values of a feature parameter, so as to optimize resource utilization of a system, decrease processing complexity, and reduce power consumption.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

The embodiments of the present invention provide a signal transmission method, user equipment, and a base station. The embodiments of the present invention can optimize resource utilization of a system, decrease processing complexity, and reduce power consumption.

Figure 1:
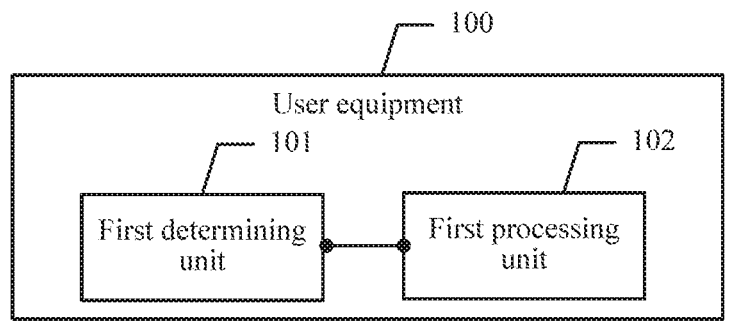
FIG. 1 is a schematic diagram of an embodiment of UE according to the present invention.

Referring to FIG. 1, FIG. 1 shows an embodiment of UE in the present invention, and UE 100 of this embodiment includes a first determining unit 101, configured to determine a feature parameter of the UE, where the feature parameter of the UE refers to: a value or information used to measure communication quality of the UE, and/or a value or information used to measure channel quality of the UE, and/or information used to reflect a service feature of the UE.

A first processing unit 102 is configured to: according to the feature parameter of the UE and a preset correspondence, determine a coverage enhancement technology used by the UE to transmit a first signal, and/or determine a second signal that the UE supports transmitting, and/or determine a function, supported by the UE, of a third signal.

For ease of comprehension, the following describes, by using an actual application scenario, an interaction manner between the units of the UE 100 in this embodiment:

First, the first determining unit 101 determines a feature parameter of the UE, where the feature parameter of the UE refers to a value or information used to measure communication quality of the UE, and/or a value or information used to measure channel quality of the UE, and/or information used to reflect a service feature of the UE.

Specifically, the feature parameter of the UE may include at least one of the following: a resource, a resource index, a level, a level index, an enhancement level, an enhancement level index, a repetition level, a repetition level index, a quantity of repetition times, an index of a quantity of repetition times, a coverage enhancement value, an index of a coverage enhancement range, a path loss value, an index of a path loss range, a reference signal received power value, an index of a reference signal received power range, a reference signal received quality value, an index of a reference signal received quality range, a channel quality information value, an index of a channel quality information range, a service type, an index of a service type, a power saving requirement, an index of a power saving requirement, a delay requirement, an index of a delay requirement, a quantity of times of detecting a pre-specified channel, an index of a quantity of times of detecting a pre-specified channel, a mobility requirement, and an index of a mobility requirement.

The first determining unit 101 may determine the feature parameter of the UE according to received signaling that indicates the feature parameter of the UE, where the signaling may be sent by another UE to the UE of this embodiment, or may be sent by a base station or another network entity to the UE. Alternatively, the first determining unit 101 determines the feature parameter of the UE according to whether a downlink signal can be correctly received. For example, the UE sends an uplink signal to a base station, and if the UE can correctly receive a corresponding downlink signal that is fed back by the base station, the first determining unit 101 can determine a current feature parameter of the UE (for example, a feature parameter that represents current communication quality). More specifically, when the feature parameter is an enhancement level index (or a repetition level index, a repetition level, or an enhancement level), the uplink signal is a physical random access channel (PRACH), and the downlink signal is a random access response, if the UE successfully receives the random access response or successfully completes a random access process after repeatedly sending the PRACH r times on a PRACH resource (a time resource, and/or a frequency resource, and/or a codeword resource) corresponding to the enhancement level index (or the repetition level index, the repetition level, or the enhancement level) x according to a quantity r of PRACH repetition times that is corresponding to the enhancement level index (or the repetition level index, the repetition level, or the enhancement level) x, the UE determines that the feature parameter of the UE is the enhancement level index (or the repetition level index, the repetition level, or the enhancement level) x. Alternatively, the first determining unit 101 determines the feature parameter of the UE by measuring a received downlink signal. Specifically, the UE may determine the feature parameter of the UE by measuring a reference signal, a synchronization signal, or a physical broadcast channel. Alternatively, the first determining unit 101 determines the feature parameter of the UE autonomously.

After the first determining unit 101 determines the feature parameter of the UE, according to the feature parameter of the UE and a preset correspondence, the first processing unit 102 determines a coverage enhancement technology used by the UE to transmit a first signal, and/or determines a second signal that the UE supports transmitting, and/or determines a function, supported by the UE, of a third signal.

In this embodiment, the preset correspondence may be a preset function relationship, a preset table relationship, or a preset specification relationship, and the preset correspondence may be preconfigured by a base station by using signaling or may be preset by a system by using a standard protocol.

The preset correspondence refers to a preset correspondence between a feature parameter and a coverage enhancement technology that is used to transmit the first signal, a preset correspondence between a feature parameter and a second signal of which transmission is supported, and a preset correspondence between a feature parameter and a supported function of the third signal.

Specifically, the preset correspondence between a feature parameter and a coverage enhancement technology that is used to transmit the first signal may be: if the feature parameter is less than or equal to a feature parameter threshold, the UE uses a first coverage enhancement technology to transmit the first signal, and if the feature parameter is greater than the feature parameter threshold, the UE uses a second coverage enhancement technology to transmit the first signal, where both the first coverage enhancement technology and the second coverage enhancement technology are technologies for improving signal transmission reliability, and a main difference between the two lies in that they can implement different converge enhancement intensities.

The preset correspondence between a feature parameter and a second signal of which transmission is supported may be: if the feature parameter is less than or equal to the feature parameter threshold, the UE supports transmitting a second signal in a signal set 1, and if the feature parameter is greater than the feature parameter threshold, the UE supports transmitting a second signal in a signal set 2, where the second signal in the signal set 1 and the second signal in the signal set 2 are different, and the difference herein mainly refers to that the signal set 1 and the second set 2 include different types of second signals, but the signal set 1 and the second set 2 may include a same quantity of or different quantities of second signals.

The preset correspondence between a feature parameter and a supported function of the third signal may be: if the feature parameter is less than or equal to the feature parameter threshold, the UE supports using a function in a first function set of the third signal, and if the feature parameter is greater than the feature parameter threshold, the UE supports using a function in a second function set of the third signal, where the function in the first function set and the function in the second function set are not completely the same.

Besides, the preset correspondence between a feature parameter and a coverage enhancement technology that is used to transmit the first signal may also be: if the feature parameter belongs to a first feature parameter set, the UE uses a first coverage enhancement technology to transmit the first signal, and if the feature parameter belongs to a second feature parameter set, the UE uses a second coverage enhancement technology to transmit the first signal, where both the first coverage enhancement technology and the second coverage enhancement technology are technologies for improving signal transmission reliability, and a main difference between the two lies in that they can implement different converge enhancement intensities.

The preset correspondence between a feature parameter and a second signal of which transmission is supported may also be: if the feature parameter belongs to the first feature parameter set, the UE supports transmitting a second signal in a signal set 1, and if the feature parameter belongs to the second feature parameter set, the UE supports transmitting a second signal in a signal set 2, where the second signal in the signal set 1 and the second signal in the signal set 2 are different, and the difference herein mainly refers to that the signal set 1 and the second set 2 include different types of second signals, but the signal set 1 and the second set 2 may include a same quantity of or different quantities of second signals.

The preset correspondence between a feature parameter and a supported function of the third signal may also be: if the feature parameter belongs to the first feature parameter set, the UE supports a function in a first function set of the third signal, and if the feature parameter belongs to the second feature parameter set, the UE supports using a function in a second function set of the third signal, where the function in the first function set and the function in the second function set are not completely the same.

The foregoing feature parameter threshold, signal set 1, signal set 2, first function set, second function set, first feature parameter set, and second feature parameter set may be preconfigured by the base station by using signaling or may be preset by the system by using a standard protocol.

For example, the signal set 2 includes fewer signal types than the signal set 1. The signal set 1 or the signal set 2 may be an empty set. The signal set 1 and the signal set 2 may include completely different signals, and in this case, if the UE supports transmission of a signal in the signal set 2, it indicates that the UE does not support transmission of a signal in the signal set 1. The signal set 1 or the signal set 2 includes one or more types of the following signals: a physical downlink control channel, an enhanced physical downlink control channel, a physical random access channel, a physical control format indicator channel, a physical hybrid automatic repeat request indicator channel, a unicast physical downlink shared channel, a broadcast or multicast physical downlink shared channel, a physical uplink shared channel, a physical uplink control channel, a synchronization channel, a physical broadcast channel, a common reference signal, a demodulation reference signal, a dedicated reference signal, a random access response message, a random access response acknowledgment message, a contention resolution message, system information, and a paging message.

In addition, the first function set includes a larger quantity of functions than the second function set. Specifically, for example, the third signal is a PUCCH, and the first function set and the second function set include one or more of the following functions: a function of reporting channel quality information, a scheduling request function, and a function of feeding back an acknowledgement indicating whether a signal is correctly received; however, the second function set includes a smaller quantity of functions than the first function set.

After the first determining unit 101 determines the feature parameter of the UE, the first processing unit 102 may determine, according to the preset correspondence between a feature parameter and a coverage enhancement technology that is used to transmit the first signal, a coverage enhancement technology that is used to transmit the first signal and that corresponds to the feature parameter of the UE; and/or
   the first processing unit 102 determines, according to the preset correspondence between a feature parameter and a second signal of which transmission is supported, a second signal to which the feature parameter of the UE corresponds, wherein transmission of the second signal is supported by the feature parameter; and/or
   the first processing unit 102 determines, according to the preset correspondence between a feature parameter and a supported function of the third signal, a supported function that is corresponding to the feature parameter of the UE and is of the third signal.

The first signal, the second signal, and the third signal herein may be the same or may be different. That is, the first signal and the second signal may be the same or may be different; the first signal and the third signal may be the same or may be different; and the second signal and the third signal may be the same or may be different.

The first signal, the second signal, or the third signal includes at least one of the following:
   a physical downlink control channel, an enhanced physical downlink control channel, a physical random access channel, a physical control format indicator channel, a physical hybrid automatic repeat request indicator channel, a unicast physical downlink shared channel, a broadcast or multicast physical downlink shared channel, a physical uplink shared channel, a physical uplink control channel, a synchronization channel, a physical broadcast channel, a common reference signal, a demodulation reference signal, a dedicated reference signal, a random access response message, a random access response acknowledgment message, a contention resolution message, system information, and a paging message.

The "transmission" in this embodiment refers to sending or receiving. The "transmit" in this embodiment refers to send or receive.

By using an example in which the feature parameter of the UE is a coverage enhancement value, the following describes determining, by the UE according to the feature parameter of the UE and the preset correspondence, the coverage enhancement technology used by the UE to transmit the first signal, and/or determining the second signal that the UE supports transmitting, and/or determining the function, supported by the UE, of the third signal.

For example, the preset correspondence, specified by the base station or the system in advance, between a feature parameter and a coverage enhancement technology that is used to transmit the first signal is: when a coverage enhancement value is X dB (or is greater than 0 dB and less than or equal to X dB), a first coverage enhancement technology is used to transmit the first signal; when the coverage enhancement value is Y dB (or is greater than X dB, or is greater than X dB and less than or equal to Y dB), a second coverage enhancement technology is used to transmit the first signal. Herein, X and/or Y are/is a predefined feature threshold.

If the first determining unit 101 determines that a coverage enhancement value of the UE is X dB (or is greater than 0 dB and less than or equal to X dB), the first processing unit 102 determines, according to the correspondence between a feature parameter and a coverage enhancement technology that is used to transmit the first signal, that the first coverage enhancement technology is used to transmit the first signal. If the first determining unit 101 determines that the coverage enhancement value of the UE is Y dB (or is greater than X dB, or is greater than X dB and less than or equal to Y dB), the first processing unit 102 determines, according to the correspondence between a feature parameter and a coverage enhancement technology that is used to transmit the first signal, that the second coverage enhancement technology is used to transmit the first signal.

In this embodiment, the first coverage enhancement technology and the second coverage enhancement technology may be one of or a combination of multiple of the following technologies: retransmission, spread spectrum transmission, low bit-rate transmission, transmission time interval bundling (TTI bundling) transmission, power boosting (power boosting), power spectrum density boosting (PSD boosting), keep trying (keep trying), relaxing requirement, frequency hopping, and maximum likelihood detection.

More specifically, for example, the first signal is a physical uplink control channel (PUCCH), and the base station or the system specifies in advance: when a coverage enhancement value is greater than 0 dB and less than or equal to X dB, the relaxing requirement (and/or frequency hopping) is used to perform PUCCH coverage enhancement; when the coverage enhancement value is greater than X dB and less than or equal to Y dB (or is greater than X dB), the relaxing requirement (and/or frequency hopping) and repeated transmission are used to perform PUCCH coverage enhancement. Herein, X and/or Y are/is a predefined feature parameter threshold. For example, it is specified in advance that X=5, and Y=10. If the coverage enhancement value determined by the first determining unit 101 is 3 dB, that is, the coverage enhancement value is less than 5 dB, the first processing unit 102 determines that the relaxing requirement (and/or frequency hopping) is used to perform PUCCH coverage enhancement for the PUCCH. If the coverage enhancement value determined by the first determining unit 101 is 8 dB, that is, the coverage enhancement value is greater than 5 dB and less than 10 dB (or is greater than 5 dB), the first processing unit 102 determines that the relaxing requirement (and/or frequency hopping) and repeated transmission are used to perform PUCCH coverage enhancement for the PUCCH.

Specifically, for another example, the first signal is a physical broadcast channel (PBCH), and the base station or the system specifies in advance: when a coverage enhancement value is C dB, keep trying is used to perform PBCH coverage enhancement; when the coverage enhancement value is D dB, keep trying and retransmission are used to perform PBCH coverage enhancement. Herein, C and/or D are/is a predefined feature parameter threshold. For example, it is specified in advance that C=10, and D=15. If the first determining unit 101 determines that the coverage enhancement value is 10 dB, the first processing unit 102 determines that keep trying is used to perform PBCH coverage enhancement for the PBCH, and the first processing unit 102 keeps trying PBCH detection to detect the PBCH. If the first determining unit 101 determines that the coverage enhancement value is 15 dB, the first processing unit 102 determines that keep trying and retransmission are used to perform PBCH coverage enhancement for the PBCH, and the first processing unit 102 keeps trying repetition of PBCH detection to detect the PBCH.

For example, the preset correspondence, specified by the base station or the system in advance, between a feature parameter and a second signal of which transmission is supported is: when a coverage enhancement value is X dB (or is greater than 0 dB and less than or equal to X dB), the UE supports transmitting a second signal in a signal set 1; when the coverage enhancement value is Y dB (or is greater than X dB, or is greater than X dB and less than or equal to Y dB), the UE supports transmitting a second signal in a signal set 2. Herein, X and/or Y are/is a predefined feature threshold.

If the first determining unit 101 determines that the coverage enhancement value of the UE is X dB (or is greater than 0 dB and less than or equal to X dB), the first processing unit 102 determines, according to the correspondence between a feature parameter and a second signal of which transmission is supported, that transmission of the second signal in the signal set 1 is supported. If the first determining unit 101 determines that the coverage enhancement value of the UE is Y dB (or is greater than X dB, or is greater than X dB and less than or equal to Y dB), the first processing unit 102 determines, according to the correspondence between a feature parameter and a second signal of which transmission is supported, that transmission of the second signal in the signal set 2 is supported.

More specifically, for example, the second signal in the transmission signal set 1 is a PBCH and a physical hybrid automatic repeat request indicator channel (PHICH), and the second signal in the transmission signal set 2 is a PBCH. The base station or the system specifies in advance: when a coverage enhancement value is greater than 0 dB and less than or equal to X dB, transmission of the second signal in the signal set 1 is supported; when the coverage enhancement value is greater than X dB and less than or equal to Y dB (or is greater than X dB), transmission of the second signal in the signal set 2 is supported. Herein, X and/or Y are/is a predefined feature parameter threshold. For example, it is specified in advance that X=5, and Y=10. If the coverage enhancement value determined by the first determining unit 101 is 3 dB, that is, the coverage enhancement value is less than 5 dB, the first processing unit 102 determines that the PBCH and PHICH can be supported. If the coverage enhancement value determined by the first determining unit 101 is 8 dB, that is, the coverage enhancement value is greater than 5 dB and less than 10 dB, the first processing unit 102 determines that the PBCH is supported, that is, the first processing unit 102 determines that the PHICH is not supported.

Specifically, for another example, the second signal in the transmission signal set 1 is a PUCCH (or a PHICH), and the second signal in the transmission signal set 2 is a null signal, that is, the transmission signal set 2 does not include any signal. The base station or the system specifies in advance: when a coverage enhancement value is greater than 0 dB and less than or equal to X dB, transmission of the second signal in the signal set 1 is supported; when the coverage enhancement value is greater than X dB and less than or equal to Y dB (or is greater than X dB), transmission of the second signal in the signal set 2 is supported. Herein, X and/or Y are/is a predefined feature parameter threshold. For example, it is specified in advance that X=5, and Y=10. If a coverage enhancement value of UE 1 is 3 dB, the UE 1 determines that the coverage enhancement value of the UE 1 is less than 5 dB, and therefore, the UE 1 determines that the PUCCH (or the PHICH) can be supported. If the coverage enhancement value of the UE 1 is 8 dB, the UE 1 determines that the coverage enhancement value of the UE 1 is greater than 5 dB and less than 10 dB (or is greater than 5 dB), and the UE 1 determines that transmission of the signal in the signal set 1 is not supported, that is, the UE 1 determines that the PUCCH (or the PHICH) is not supported.

For example, the preset correspondence, specified by the base station or the system in advance, between a feature parameter and a supported function of the third signal is: when a coverage enhancement value is X dB (or is greater than 0 dB and less than or equal to X dB), the UE supports a function in a first function set of the third signal; when the coverage enhancement value is Y dB (or is greater than X dB, or is greater than X dB and less than or equal to Y dB), the UE supports a function in a second function of the third signal. Herein, X and/or Y are/is a predefined feature threshold.

If the first determining unit 101 determines that the coverage enhancement value of the UE is X dB (or is greater than 0 dB and less than or equal to X dB), the first processing unit 102 determines, according to the correspondence between a feature parameter and a supported function of the third signal, that the function in the first function set of the third signal is supported. If the first determining unit 101 determines that the coverage enhancement value of the UE is Y dB (or is greater than X dB, or is greater than X dB and less than or equal to Y dB), the first processing unit 102 determines, according to the correspondence between a feature parameter and a supported function of the third signal, that the function in the second function set of the third signal is supported.

More specifically, for example, the third signal is a PUCCH. The base station or the system specifies in advance that functions in a first function set of the PUCCH include a function of reporting channel quality information, a scheduling request function, and a function of feeding back an acknowledgement indicating whether a signal is correctly received; functions in a second function set of the PUCCH include a scheduling request function, and a function of feeding back an acknowledgement indicating whether a signal is correctly received. Besides, the base station or the system specifies in advance: when a coverage enhancement value is greater than 0 dB and less than or equal to X dB, the functions in the first function set of the third signal are supported; when the coverage enhancement value is greater than X dB and less than or equal to Y dB (or is greater than X dB), the functions in the second function set of the third signal are supported. Herein, X and/or Y are/is a predefined feature parameter threshold. For example, it is specified in advance that X=5, and Y=10. If the coverage enhancement value determined by the first determining unit 101 is 3 dB, that is, the coverage enhancement value is less than 5 dB, the first processing unit 102 determines that the following functions of the PUCCH are supported: the function of reporting channel quality information, the scheduling request function, and the function of feeding back an acknowledgement indicating whether a signal is correctly received. If the coverage enhancement value determined by the first determining unit 101 is 8 dB, that is, the coverage enhancement value is greater than 5 dB and less than 10 dB (or is greater than 5 dB), the first processing unit 102 determines that the scheduling request function and the function of feeding back an acknowledgement indicating whether a signal is correctly received of the PUCCH are supported.

It should be noted that the foregoing description of method implementation of this embodiment is provided by using an example in which the feature parameter is a coverage enhancement value. When the feature parameter is a level, a level index, a quantity of repetition times, an index of a quantity of repetition times, a resource, a resource index, an enhancement level, an enhancement level index, or other information (which reflects communication quality, channel quality, or a service feature), implementation of this embodiment may be performed similarly according to the foregoing description, and details are not described herein again.

In this embodiment, according to a current feature parameter of UE and a preset correspondence, a first processing unit may adaptively determine a coverage enhancement technology used to transmit a first signal between the UE and a base station, and/or determine a second signal of which transmission is supported between the UE and a base station, and/or determine a supported function of a third signal, thereby adapting to different feature parameters, so as to optimize resource utilization of a system, decrease processing complexity, and reduce power consumption.

Figure 2:
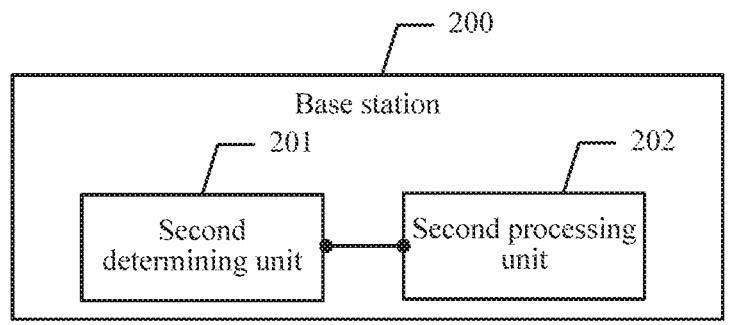
FIG. 2 is a schematic diagram of an embodiment of a base station according to the present invention.

The following describes a base station provided by an embodiment of the present invention. Referring to FIG. 2, a base station 200 of this embodiment includes: a second determining unit 201, configured to determine a feature parameter of UE, where the feature parameter of the UE refers to: a value or information used to measure communication quality of the UE, and/or a value or information used to measure channel quality of the UE, and/or information used to reflect a service feature of the UE; and a second processing unit 202, configured to: according to the feature parameter of the UE and a preset correspondence, determine a coverage enhancement technology used by the base station to transmit a first signal, and/or determine a second signal that the base station supports transmitting, and/or determine a function, supported by the base station, of a third signal.

For ease of comprehension, the following describes, by using an actual application scenario, an interaction manner between the units of the base station 200 in this embodiment:

The UE in this embodiment refers to one or more UEs that communicate with the base station 200. For the purpose of simplicity, the UE in the following refers to one UE.

First, the second determining unit 201 determines a feature parameter of UE, where the feature parameter of the UE refers to a value or information used to measure communication quality of the UE, and/or a value or information used to measure channel quality of the UE, and/or information used to reflect a service feature of the UE.

Specifically, the feature parameter of the UE may include at least one of the following: a resource, a resource index, a level, a level index, an enhancement level, an enhancement level index, a repetition level, a repetition level index, a quantity of repetition times, an index of a quantity of repetition times, a coverage enhancement value, an index of a coverage enhancement range, a path loss value, an index of a path loss range, a reference signal received power value, an index of a reference signal received power range, a reference signal received quality value, an index of a reference signal received quality range, a channel quality information value, an index of a channel quality information range, a service type, an index of a service type, a power saving requirement, an index of a power saving requirement, a delay requirement, an index of a delay requirement, a quantity of times of detecting a pre-specified channel, an index of a quantity of times of detecting a pre-specified channel, a mobility requirement, and an index of a mobility requirement.

The second determining unit 201 may determine the feature parameter of the UE according to received signaling that indicates the feature parameter of the UE, where the signaling may be sent by the UE or another network entity to the base station. Alternatively, the second determining unit 201 determines the feature parameter of the UE according to whether an uplink signal can be correctly received. For example, the base station sends a downlink signal to the UE, and if the base station can correctly receive a corresponding uplink signal that is fed back by the UE, the second determining unit 201 can determine a current feature parameter of the UE (for example, a feature parameter that represents current communication quality). Alternatively, the second determining unit 201 determines the feature parameter of the UE by measuring a received uplink signal. Alternatively, the second determining unit 201 determines the feature parameter of the UE autonomously.

After the second determining unit 201 determines the feature parameter of the UE, according to the feature parameter of the UE and a preset correspondence, the second processing unit 202 determines a coverage enhancement technology used by the base station to transmit a first signal, and/or determines a second signal that the base station supports transmitting, and/or determines a function, supported by the base station, of a third signal.

In this embodiment, the preset correspondence may be a preset function relationship, a preset table relationship, or a preset specification relationship, and the preset correspondence may be preconfigured by the base station by using signaling or may be preset by a system by using a standard protocol.

The preset correspondence refers to a preset correspondence between a feature parameter and a coverage enhancement technology that is used to transmit the first signal, a preset correspondence between a feature parameter and a second signal of which transmission is supported, and a preset correspondence between a feature parameter and a supported function of the third signal.

Specifically, the preset correspondence between a feature parameter and a coverage enhancement technology that is used to transmit the first signal may be: if the feature parameter is less than or equal to a feature parameter threshold, the base station uses a first coverage enhancement technology to transmit the first signal, and if the feature parameter is greater than the feature parameter threshold, the base station uses a second coverage enhancement technology to transmit the first signal, where both the first coverage enhancement technology and the second coverage enhancement technology are technologies for improving signal transmission reliability, and a main difference between the two lies in that they can implement different converge enhancement intensities.

The preset correspondence between a feature parameter and a second signal of which transmission is supported may be: if the feature parameter is less than or equal to the feature parameter threshold, the base station supports transmitting a second signal in a signal set 1, and if the feature parameter is greater than the feature parameter threshold, the base station supports transmitting a second signal in a signal set 2, where the second signal in the signal set 1 and the second signal in the signal set 2 are different, and the difference herein mainly refers to that the signal set 1 and the second set 2 include different types of second signals, but the signal set 1 and the second set 2 may include a same quantity of or different quantities of second signals.

The preset correspondence between a feature parameter and a supported function of the third signal may be: if the feature parameter is less than or equal to the feature parameter threshold, the base station supports using a function in a first function set of the third signal, and if the feature parameter is greater than the feature parameter threshold, the base station supports using a function in a second function set of the third signal, where the function in the first function set and the function in the second function set are not completely the same.

Besides, the preset correspondence between a feature parameter and a coverage enhancement technology that is used to transmit the first signal may also be: if the feature parameter belongs to a first feature parameter set, the base station uses a first coverage enhancement technology to transmit the first signal, and if the feature parameter belongs to a second feature parameter set, the base station uses a second coverage enhancement technology to transmit the first signal, where both the first coverage enhancement technology and the second coverage enhancement technology are technologies for improving signal transmission reliability, and a main difference between the two lies in that they can implement different coverage enhancement intensities.

The preset correspondence between a feature parameter and a second signal of which transmission is supported may also be: if the feature parameter belongs to the first feature parameter set, the base station supports transmitting a second signal in a signal set 1, and if the feature parameter belongs to the second feature parameter set, the base station supports transmitting a second signal in a signal set 2, where the second signal in the signal set 1 and the second signal in the signal set 2 are different, and the difference herein mainly refers to that the signal set 1 and the second set 2 include different types of second signals, but the signal set 1 and the second set 2 may include a same quantity of or different quantities of second signals.

The preset correspondence between a feature parameter and a supported function of the third signal may also be: if the feature parameter belongs to the first feature parameter set, the base station supports a function in a first function set of the third signal, and if the feature parameter belongs to the second feature parameter set, the base station supports using a function in a second function set of the third signal, where the function in the first function set and the function in the second function set are not completely the same.

The foregoing feature parameter threshold, signal set 1, signal set 2, first function set, second function set, first feature parameter set, and second feature parameter set may be preconfigured by the base station by using signaling or may be preset by the system by using a standard protocol.

For example, the signal set 2 includes fewer signal types than the signal set 1. The signal set 1 or the signal set 2 may be an empty set. The signal set 1 and the signal set 2 may include completely different signals, and in this case, if the base station supports transmission of a signal in the signal set 2, it indicates that the base station does not support transmission of a signal in the signal set 1. The signal set 1 or the signal set 2 includes one or more types of the following signals: a physical downlink control channel, an enhanced physical downlink control channel, a physical random access channel, a physical control format indicator channel, a physical hybrid automatic repeat request indicator channel, a unicast physical downlink shared channel, a broadcast or multicast physical downlink shared channel, a physical uplink shared channel, a physical uplink control channel, a synchronization channel, a physical broadcast channel, a common reference signal, a demodulation reference signal, a dedicated reference signal, a random access response message, a random access response acknowledgment message, a contention resolution message, system information, and a paging message.

In addition, the first function set includes a larger quantity of functions than the second function set. Specifically, for example, the third signal is a PUCCH, and the first function set and the second function set include one or more of the following functions: a function of reporting channel quality information, a scheduling request function, and a function of feeding back an acknowledgement indicating whether a signal is correctly received; however, the second function set includes a smaller quantity of functions than the first function set.

After the second determining unit 201 determines the feature parameter of the UE, the second processing unit 202 may determine, according to the preset correspondence between a feature parameter and a coverage enhancement technology that is used to transmit the first signal, a coverage enhancement technology that is used to transmit the first signal and that corresponds to the feature parameter of the UE; and/or the second processing unit 202 determines, according to the preset correspondence between a feature parameter and a second signal of which transmission is supported, a second signal to which the feature parameter of the UE corresponds, wherein transmission of the second signal is supported by the feature parameter; and/or the second processing unit 202 determines, according to the preset correspondence between a feature parameter and a supported function of the third signal, a supported function that is corresponding to the feature parameter of the UE and is of the third signal.

The first signal, the second signal, and the third signal herein may be the same or may be different. That is, the first signal and the second signal may be the same or may be different; the first signal and the third signal may be the same or may be different; and the second signal and the third signal may be the same or may be different.

The first signal, the second signal, or the third signal includes at least one of the following:

a physical downlink control channel, an enhanced physical downlink control channel, a physical random access channel, a physical control format indicator channel, a physical hybrid automatic repeat request indicator channel, a unicast physical downlink shared channel, a broadcast or multicast physical downlink shared channel, a physical uplink shared channel, a physical uplink control channel, a synchronization channel, a physical broadcast channel, a common reference signal, a demodulation reference signal, a dedicated reference signal, a random access response message, a random access response acknowledgment message, a contention resolution message, system information, and a paging message.

The "transmission" in this embodiment refers to sending or receiving. The "transmit" in this embodiment refers to send or receive.

By using an example in which the feature parameter of the UE is a coverage enhancement value, the following describes determining, by the base station according to the feature parameter of the UE and the preset correspondence, the coverage enhancement technology used by the base station to transmit the first signal, and/or determining the second signal that the base station supports transmitting, and/or determining the function, supported by the base station, of the third signal.

For example, the preset correspondence, specified by the base station or the system in advance, between a feature parameter and a coverage enhancement technology that is used to transmit the first signal is: when a coverage enhancement value is X dB (or is greater than 0 dB and less than or equal to X dB), a first coverage enhancement technology is used to transmit the first signal; when the coverage enhancement value is Y dB (or is greater than X dB, or is greater than X dB and less than or equal to Y dB), a second coverage enhancement technology is used to transmit the first signal. Herein, X and/or Y are/is a predefined feature threshold.

If the second determining unit 201 determines that a coverage enhancement value of UE is X dB (or is greater than 0 dB and less than or equal to X dB), the second processing unit 202 determines, according to the correspondence between a feature parameter and a coverage enhancement technology that is used to transmit the first signal, that the first coverage enhancement technology is used to transmit the first signal during communication with the UE. If the second determining unit 201 determines that the coverage enhancement value of the UE is Y dB (or is greater than X dB, or is greater than X dB and less than or equal to Y dB), the second processing unit 202 determines, according to the correspondence between a feature parameter and a coverage enhancement technology that is used to transmit the first signal, that the second coverage enhancement technology is used to transmit the first signal during communication with the UE.

In this embodiment, the first coverage enhancement technology and the second coverage enhancement technology may be one of or a combination of multiple of the following technologies: retransmission, spread spectrum transmission, low bit-rate transmission, transmission time interval bundling (TTI bundling) transmission, power boosting (power boosting), power spectrum density boosting (PSD boosting), keep trying (keep trying), relaxing requirement, frequency hopping, and maximum likelihood detection.

More specifically, for example, the first signal is a physical uplink control channel PUCCH, and the base station or the system specifies in advance: when a coverage enhancement value is greater than 0 dB and less than or equal to X dB, the relaxing requirement (and/or frequency hopping) is used to perform PUCCH coverage enhancement; when the coverage enhancement value is greater than X dB and less than or equal to Y dB (or is greater than X dB), the relaxing requirement (and/or frequency hopping) and repeated transmission are used to perform PUCCH coverage enhancement. Herein, X and/or Y are/is a predefined feature parameter threshold. For example, it is specified in advance that X=5, and Y=10. If the second determining unit 201 determines that a coverage enhancement value of UE 1 is 3 dB, that is, the coverage enhancement value is less than 5 dB, the second processing unit 202 determines that the relaxing requirement (and/or frequency hopping) is used to perform PUCCH coverage enhancement for the PUCCH, and the second processing unit 202 correspondingly receives the PUCCH in this manner. If the second determining unit 201 determines that a coverage enhancement value of UE 2 is 8 dB, that is, the coverage enhancement value is greater than 5 dB and less than 10 dB (or is greater than 5 dB), the second processing unit 202 determines that the relaxing requirement (and/or frequency hopping) and repeated transmission are used to perform PUCCH coverage enhancement for the PUCCH, and the second processing unit 202 correspondingly receives the PUCCH in this manner.

Specifically, for another example, the first signal is a physical broadcast channel PBCH, and the base station or the system specifies in advance: when a coverage enhancement value is not greater than C dB, keep trying is used to perform PBCH coverage enhancement; when the coverage enhancement value is not greater than D dB, keep trying and retransmission are used to perform PBCH coverage enhancement. Herein, C and/or D are/is a predefined feature parameter threshold. For example, it is specified in advance that C=10, and D=15. If the second determining unit 201 determines that a current coverage enhancement value of UE (one UE or multiple UEs) is not greater than 10 dB, the second processing unit 202 determines that keep trying is used to perform PBCH coverage enhancement for the PBCH. If the second determining unit 201 determines that a current coverage enhancement value of UE (one UE or multiple UEs) is not greater than 15 dB, the second determining unit 201 determines that keep trying and retransmission are used to perform PBCH coverage enhancement for the PBCH.

For example, the preset correspondence, specified by the base station or the system in advance, between a feature parameter and a second signal of which transmission is supported is: when a coverage enhancement value is X dB (or is greater than 0 dB and less than or equal to X dB), the base station supports transmitting a second signal in a signal set 1; when the coverage enhancement value is Y dB (or is greater than X dB, or is greater than X dB and less than or equal to Y dB), the base station supports transmitting a second signal in a signal set 2. Herein, X and/or Y are/is a predefined feature threshold.

If the second determining unit 201 determines that a coverage enhancement value of UE is X dB (or is greater than 0 dB and less than or equal to X dB), the second processing unit 202 determines, according to the correspondence between a feature parameter and a second signal of which transmission is supported, that transmission of the second signal in the signal set 1 is supported during communication with the UE. If the second determining unit 201 determines that the coverage enhancement value of the UE is Y dB (or is greater than X dB, or is greater than X dB and less than or equal to Y dB), the second processing unit 202 determines, according to the correspondence between a feature parameter and a second signal of which transmission is supported, that transmission of the second signal in the signal set 2 is supported during communication with the UE.

More specifically, for example, the second signal in the transmission signal set 1 is a PBCH and a physical hybrid automatic repeat request indicator channel PHICH, and the second signal in the signal set 2 is a PBCH. The base station or the system specifies in advance: when a coverage enhancement value is greater than 0 dB and less than or equal to X dB, transmission of the second signal in the signal set 1 is supported; when the coverage enhancement value is greater than X dB and less than or equal to Y dB (or is greater than X dB), transmission of the second signal in the signal set 2 is supported. Herein, X and/or Y are/is a predefined feature parameter threshold. For example, it is specified in advance that X=5, and Y=10. If a coverage enhancement value of UE 1 is 3 dB, the second determining unit 201 determines that the coverage enhancement value of the UE 1 is less than 5 dB, and therefore, the second processing unit 202 determines that the PBCH and the PHICH can be supported during communication with the UE 1. If the second determining unit 201 determines that a coverage enhancement value of UE 2 is 8 dB, that is, the coverage enhancement value of the UE 2 is greater than 5 dB and less than 10 dB, the second processing unit 202 determines that the PBCH is supported during communication with the UE 2, that is, it is determined the PHICH is not supported during communication with the UE 2.

Specifically, for another example, the second signal in the transmission signal set 1 is a PUCCH (or a PHICH), and the second signal in the transmission signal set 2 is a null signal, that is, the transmission signal set 2 does not include any signal. The base station or the system specifies in advance: when a coverage enhancement value is greater than 0 dB and less than or equal to X dB, transmission of the second signal in the signal set 1 is supported; when the coverage enhancement value is greater than X dB and less than or equal to Y dB (or is greater than X dB), transmission of the second signal in the signal set 2 is supported. Herein, X and/or Y are/is a predefined feature parameter threshold. For example, it is specified in advance that X=5, and Y=10. If the second determining unit 201 determines that a coverage enhancement value of UE 1 is 3 dB, that is, it is determined that the coverage enhancement value of the UE 1 is less than 5 dB, the second processing unit 202 determines that the PUCCH (or the PHICH) can be supported during communication with the UE 1. If the second determining unit 201 determines that the coverage enhancement value of the UE 1 is 8 dB, that is, the coverage enhancement value is greater than 5 dB and less than 10 dB (or is greater than 5 dB), the second processing unit 202 determines that transmission of the signal in the signal set 1 is not supported during communication with the UE 1, that is, the PUCCH (or the PHICH) is not supported during communication between the base station and the UE 1.

For example, the preset correspondence, specified by the base station or the system in advance, between a feature parameter and a supported function of the third signal is: when a coverage enhancement value is X dB (or is greater than 0 dB and less than or equal to X dB), the base station supports a function in a first function set of the third signal; when the coverage enhancement value is Y dB (or is greater than X dB, or is greater than X dB and less than or equal to Y dB), the base station supports a function in a second function of the third signal. Herein, X and/or Y are/is a predefined feature threshold.

If the second determining unit 201 determines that a coverage enhancement value of UE is X dB (or is greater than 0 dB and less than or equal to X dB), the second processing unit 202 determines, according to the correspondence between a feature parameter and a supported function of the third signal, that the function in the first function set of the third signal is supported. If the second determining unit 201 determines that the coverage enhancement value of the UE is Y dB (or is greater than X dB, or is greater than X dB and less than or equal to Y dB), the second processing unit 202 determines, according to the correspondence between a feature parameter and a supported function of the third signal, that the function in the second function set of the third signal is supported.

More specifically, for example, the third signal is a PUCCH. The base station or the system specifies in advance that functions in a first function set of the PUCCH include a function of reporting channel quality information, a scheduling request function, and a function of feeding back an acknowledgement indicating whether a signal is correctly received; functions in a second function set of the PUCCH include a scheduling request function, and a function of feeding back an acknowledgement indicating whether a signal is correctly received. Besides, the base station or the system specifies in advance: when a coverage enhancement value is greater than 0 dB and less than or equal to X dB, the functions in the first function set of the third signal are supported; when the coverage enhancement value is greater than X dB and less than or equal to Y dB (or is greater than X dB), the functions in the second function set of the third signal are supported. Herein, X and/or Y are/is a predefined feature parameter threshold. For example, it is specified in advance that X=5, and Y=10. If the second determining unit 201 determines that a coverage enhancement value of UE 1 is 3 dB, that is, it is determined that the coverage enhancement value of the UE 1 is less than 5 dB, the second processing unit 202 determines that the following functions of the PUCCH are supported during communication with the UE 1: the function of reporting channel quality information, the scheduling request function, and the function of feeding back an acknowledgement indicating whether a signal is correctly received. If the second determining unit 201 determines that the coverage enhancement value of the UE 1 is 8 dB, that is, it is determined that the coverage enhancement value of the UE 1 is greater than 5 dB and less than 10 dB (or is greater than 5 dB), the second processing unit 202 determines that the scheduling request function and the function of feeding back an acknowledgement indicating whether a signal is correctly received of the PUCCH are supported during communication with the UE 1.

It should be noted that the foregoing description of method implementation of this embodiment is provided by using an example in which the feature parameter is a coverage enhancement value. When the feature parameter is a level, a level index, a quantity of repetition times, an index of a quantity of repetition times, a resource, a resource index, an enhancement level, an enhancement level index, or other information (which reflects communication quality, channel quality, or a service feature), implementation of this embodiment may be performed similarly according to the foregoing description, and details are not described herein again.

In this embodiment, according to a current feature parameter of UE and a preset correspondence, a second processing unit may adaptively determine a coverage enhancement technology used to transmit a first signal between the UE and the base station, and/or determine a second signal of which transmission is supported between the UE and the base station, and/or determine a supported function of a third signal, thereby adapting to different feature parameters of the UE, so as to optimize resource utilization of a system, decrease processing complexity, and reduce power consumption.

Figure 3:
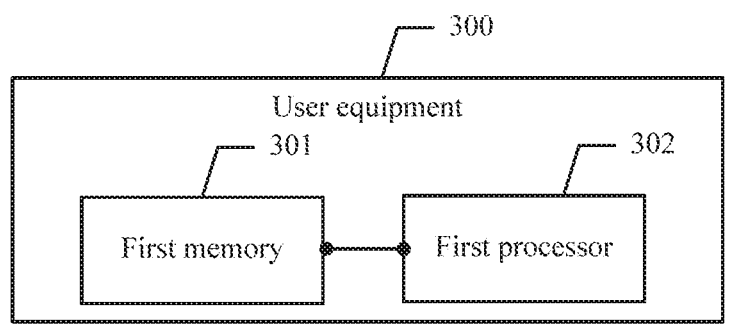
FIG. 3 is a schematic diagram of another embodiment of UE according to the present invention.

The following describes another embodiment of UE according to the present invention. Referring to FIG. 3, UE 300 of this embodiment includes:

a first memory 301, configured to store a preset correspondence; and a first processor 302, configured to determine a feature parameter of the UE, where the feature parameter of the UE refers to: a value or information used to measure communication quality of the UE, and/or a value or information used to measure channel quality of the UE, and/or information used to reflect a service feature of the UE; and according to the feature parameter of the UE and the preset correspondence, determine a coverage enhancement technology used by the UE to transmit a first signal, and/or determine a second signal that the UE supports transmitting, and/or determine a function, supported by the UE, of a third signal.

For ease of comprehension, the following describes, by using an actual application scenario, an interaction manner between the units of the UE 300 in this embodiment:

A preset correspondence is stored in the first memory 301. In this embodiment, the preset correspondence may be a preset function relationship, a preset table relationship, or a preset specification relationship, and the preset correspondence may be preconfigured by a base station by using signaling or may be preset by a system by using a standard protocol.

The preset correspondence refers to a preset correspondence between a feature parameter and a coverage enhancement technology that is used to transmit the first signal, a preset correspondence between a feature parameter and a second signal of which transmission is supported, and a preset correspondence between a feature parameter and a supported function of the third signal.

Specifically, the preset correspondence between a feature parameter and a coverage enhancement technology that is used to transmit the first signal may be: if the feature parameter is less than or equal to a feature parameter threshold, the UE uses a first coverage enhancement technology to transmit the first signal, and if the feature parameter is greater than the feature parameter threshold, the UE uses a second coverage enhancement technology to transmit the first signal, where both the first coverage enhancement technology and the second coverage enhancement technology are technologies for improving signal transmission reliability, and a main difference between the two lies in that they can implement different coverage enhancement intensities.

The preset correspondence between a feature parameter and a second signal of which transmission is supported may be: if the feature parameter is less than or equal to the feature parameter threshold, the UE supports transmitting a second signal in a signal set 1, and if the feature parameter is greater than the feature parameter threshold, the UE supports transmitting a second signal in a signal set 2, where the second signal in the signal set 1 and the second signal in the signal set 2 are different, and the difference herein mainly refers to that the signal set 1 and the second set 2 include different types of second signals, but the signal set 1 and the second set 2 may include a same quantity of or different quantities of second signals.

The preset correspondence between a feature parameter and a supported function of the third signal may be: if the feature parameter is less than or equal to the feature parameter threshold, the UE supports using a function in a first function set of the third signal, and if the feature parameter is greater than the feature parameter threshold, the UE supports using a function in a second function set of the third signal, where the function in the first function set and the function in the second function set are not completely the same.

Besides, the preset correspondence between a feature parameter and a coverage enhancement technology that is used to transmit the first signal may also be: if the feature parameter belongs to a first feature parameter set, the UE uses a first coverage enhancement technology to transmit the first signal, and if the feature parameter belongs to a second feature parameter set, the UE uses a second coverage enhancement technology to transmit the first signal, where both the first coverage enhancement technology and the second coverage enhancement technology are technologies for improving signal transmission reliability, and a main difference between the two lies that they can implement different coverage enhancement intensities.

The preset correspondence between a feature parameter and a second signal of which transmission is supported may also be: if the feature parameter belongs to the first feature parameter set, the UE supports transmitting a second signal in a signal set 1, and if the feature parameter belongs to the second feature parameter set, the UE supports transmitting a second signal in a signal set 2, where the second signal in the signal set 1 and the second signal in the signal set 2 are different, and the difference herein mainly refers to that the signal set 1 and the second set 2 include different types of second signals, but the signal set 1 and the second set 2 may include a same quantity of or different quantities of second signals.

The preset correspondence between a feature parameter and a supported function of the third signal may also be: if the feature parameter belongs to the first feature parameter set, the UE supports a function in a first function set of the third signal, and if the feature parameter belongs to the second feature parameter set, the UE supports using a function in a second function set of the third signal, where the function in the first function set and the function in the second function set are not completely the same.

The foregoing feature parameter threshold, signal set 1, signal set 2, first function set, second function set, first feature parameter set, and second feature parameter set may be preconfigured by the base station by using signaling or may be preset by the system by using a standard protocol.

For example, the signal set 2 includes fewer signal types than the signal set 1. The signal set 1 or the signal set 2 may be an empty set. The signal set 1 and the signal set 2 may include completely different signals, and in this case, if the UE supports transmission of a signal in the signal set 2, it indicates that the UE does not support transmission of a signal in the signal set 1. The signal set 1 or the signal set 2 includes one or more types of the following signals: a physical downlink control channel, an enhanced physical downlink control channel, a physical random access channel, a physical control format indicator channel, a physical hybrid automatic repeat request indicator channel, a unicast physical downlink shared channel, a broadcast or multicast physical downlink shared channel, a physical uplink shared channel, a physical uplink control channel, a synchronization channel, a physical broadcast channel, a common reference signal, a demodulation reference signal, a dedicated reference signal, a random access response message, a random access response acknowledgment message, a contention resolution message, system information, and a paging message.

In addition, the first function set includes a larger quantity of functions than the second function set. Specifically, for example, the third signal is a PUCCH, and the first function set and the second function set include one or more of the following functions: a function of reporting channel quality information, a scheduling request function, and a function of feeding back an acknowledgement indicating whether a signal is correctly received; however, the second function set includes a smaller quantity of functions than the first function set.

The first processor 302 determines a feature parameter of the UE, where the feature parameter of the UE refers to a value or information used to measure communication quality of the UE, and/or a value or information used to measure channel quality of the UE, and/or information used to reflect a service feature of the UE.

Specifically, the feature parameter of the UE may include at least one of the following: a resource, a resource index, a level, a level index, an enhancement level, an enhancement level index, a repetition level, a repetition level index, a quantity of repetition times, an index of a quantity of repetition times, a coverage enhancement value, an index of a coverage enhancement range, a path loss value, an index of a path loss range, a reference signal received power value, an index of a reference signal received power range, a reference signal received quality value, an index of a reference signal received quality range, a channel quality information value, an index of a channel quality information range, a service type, an index of a service type, a power saving requirement, an index of a power saving requirement, a delay requirement, an index of a delay requirement, a quantity of times of detecting a pre-specified channel, an index of a quantity of times of detecting a pre-specified channel, a mobility requirement, and an index of a mobility requirement.

The first processor 302 may determine the feature parameter of the UE according to received signaling that indicates the feature parameter of the UE, where the signaling may be sent by another UE to the UE of this embodiment, or may be sent by the base station or another network entity to the UE. Alternatively, the first processor 302 determines the feature parameter of the UE according to whether a downlink signal can be correctly received. For example, the UE sends an uplink signal to the base station, and if the UE can correctly receive a corresponding downlink signal that is fed back by the base station, the first processor 302 can determine a current feature parameter of the UE (for example, a feature parameter that represents current communication quality). Alternatively, the first processor 302 determines the feature parameter of the UE by measuring a received downlink signal. Alternatively, the first processor 302 determines the feature parameter of the UE autonomously.

After determining the feature parameter of the UE, according to the feature parameter of the UE and the preset correspondence, the first processor 302 determines a coverage enhancement technology used by the UE to transmit a first signal, and/or determines a second signal that the UE supports transmitting, and/or determines a function, supported by the UE, of a third signal.

After the first processor 302 determines the feature parameter of the UE, the first processor 302 may determine, according to the preset correspondence between a feature parameter and a coverage enhancement technology that is used to transmit the first signal, a coverage enhancement technology that is used to transmit the first signal and that corresponds to the feature parameter of the UE; and/or the first processor 302 determines, according to the preset correspondence between a feature parameter and a second signal of which transmission is supported, a second signal to which the feature parameter of the UE corresponds, wherein transmission of the second signal is supported by the feature parameter; and/or the first processor 302 determines, according to the preset correspondence between a feature parameter and a supported function of the third signal, a supported function that is corresponding to the feature parameter of the UE and is of the third signal.

The first signal, the second signal, and the third signal herein may be the same or may be different. That is, the first signal and the second signal may be the same or may be different; the first signal and the third signal may be the same or may be different; and the second signal and the third signal may be the same or may be different.

The first signal, the second signal, or the third signal includes at least one of the following:

a physical downlink control channel, an enhanced physical downlink control channel, a physical random access channel, a physical control format indicator channel, a physical hybrid automatic repeat request indicator channel, a unicast physical downlink shared channel, a broadcast or multicast physical downlink shared channel, a physical uplink shared channel, a physical uplink control channel, a synchronization channel, a physical broadcast channel, a common reference signal, a demodulation reference signal, a dedicated reference signal, a random access response message, a random access response acknowledgment message, a contention resolution message, system information, and a paging message.

The "transmission" in this embodiment refers to sending or receiving. The "transmit" in this embodiment refers to send or receive.

By using an example in which the feature parameter of the UE is a coverage enhancement value, the following describes determining, by the UE according to the feature parameter of the UE and the preset correspondence, the coverage enhancement technology used by the UE to transmit the first signal, and/or determining the second signal that the UE supports transmitting, and/or determining the function, supported by the UE, of the third signal.

For example, the preset correspondence, specified by the base station or the system in advance, between a feature parameter and a coverage enhancement technology that is used to transmit the first signal is: when a coverage enhancement value is X dB (or is greater than 0 dB and less than or equal to X dB), a first coverage enhancement technology is used to transmit the first signal; when the coverage enhancement value is Y dB (or is greater than X dB, or is greater than X dB and less than or equal to Y dB), a second coverage enhancement technology is used to transmit the first signal. Herein, X and/or Y are/is a predefined feature threshold.

If the first processor 302 determines that a coverage enhancement value of the UE is X dB (or is greater than 0 dB and less than or equal to X dB), the first processor 302 determines, according to the correspondence between a feature parameter and a coverage enhancement technology that is used to transmit the first signal, that the first coverage enhancement technology is used to transmit the first signal. If the first processor 302 determines that the coverage enhancement value of the UE is Y dB (or is greater than X dB, or is greater than X dB and less than or equal to Y dB), the first processor 302 determines, according to the correspondence between a feature parameter and a coverage enhancement technology that is used to transmit the first signal, that the second coverage enhancement technology is used to transmit the first signal.

In this embodiment, the first coverage enhancement technology and the second coverage enhancement technology may be one of or a combination of multiple of the following technologies: retransmission, spread spectrum transmission, low bit-rate transmission, transmission time interval bundling (TTI bundling) transmission, power boosting (power boosting), power spectrum density boosting (PSD boosting), keep trying (keep trying), relaxing requirement, frequency hopping, and maximum likelihood detection.

More specifically, for example, the first signal is a physical uplink control channel PUCCH, and the base station or the system specifies in advance: when a coverage enhancement value is greater than 0 dB and less than or equal to X dB, the relaxing requirement (and/or frequency hopping) is used to perform PUCCH coverage enhancement; when the coverage enhancement value is greater than X dB and less than or equal to Y dB (or is greater than X dB), the relaxing requirement (and/or frequency hopping) and repeated transmission are used to perform PUCCH coverage enhancement. Herein, X and/or Y are/is a predefined feature parameter threshold. For example, it is specified in advance that X=5, and Y=10. If the coverage enhancement value determined by the first processor 302 is 3 dB, that is, the coverage enhancement value is less than 5 dB, the first processor 302 determines that the relaxing requirement (and/or frequency hopping) is used to perform PUCCH coverage enhancement for the PUCCH. If the coverage enhancement value determined by the first processor 302 is 8 dB, that is, the coverage enhancement value is greater than 5 dB and less than 10 dB (or is greater than 5 dB), the first processor 302 determines that the relaxing requirement (and/or frequency hopping) and repeated transmission are used to perform PUCCH coverage enhancement for the PUCCH.

Specifically, for another example, the first signal is a physical broadcast channel PBCH, and the base station or the system specifies in advance: when a coverage enhancement value is C dB, keep trying is used to perform PBCH coverage enhancement; when the coverage enhancement value is D dB, keep trying and retransmission are used to perform PBCH coverage enhancement. Herein, C and/or D are/is a predefined feature parameter threshold. For example, it is specified in advance that C=10, and D=15. If the first processor 302 determines that the coverage enhancement value is 10 dB, the first processor 302 determines that keep trying is used to perform PBCH coverage enhancement for the PBCH, and the first processor 302 keeps trying PBCH detection to detect the PBCH. If the first processor 302 determines that the coverage enhancement value is 15 dB, the first processor 302 determines that keep trying and retransmission are used to perform PBCH coverage enhancement for the PBCH, and the first processor 302 keeps trying repetition of PBCH detection to detect the PBCH.

For example, the preset correspondence, specified by the base station or the system in advance, between a feature parameter and a second signal of which transmission is supported is: when a coverage enhancement value is X dB (or is greater than 0 dB and less than or equal to X dB), the UE supports transmitting a second signal in a signal set 1; when the coverage enhancement value is Y dB (or is greater than X dB, or is greater than X dB and less than or equal to Y dB), the UE supports transmitting a second signal in a signal set 2. Herein, X and/or Y are/is a predefined feature threshold.

If the first processor 302 determines that the coverage enhancement value of the UE is X dB (or is greater than 0 dB and less than or equal to X dB), the first processor 302 determines, according to the correspondence between a feature parameter and a second signal of which transmission is supported, that transmission of the second signal in the signal set 1 is supported. If the first processor 302 determines that the coverage enhancement value of the UE is Y dB (or is greater than X dB, or is greater than X dB and less than or equal to Y dB), the first processor 302 determines, according to the correspondence between a feature parameter and a second signal of which transmission is supported, that transmission of the second signal in the signal set 2 is supported.

More specifically, for example, the second signal in the transmission signal set 1 is a PBCH and a physical hybrid automatic repeat request indicator channel PHICH, and the second signal in the signal set 2 is a PBCH. The base station or the system specifies in advance: when a coverage enhancement value is greater than 0 dB and less than or equal to X dB, transmission of the second signal in the signal set 1 is supported; when the coverage enhancement value is greater than X dB and less than or equal to Y dB (or is greater than X dB), transmission of the second signal in the signal set 2 is supported. Herein, X and/or Y are/is a predefined feature parameter threshold. For example, it is specified in advance that X=5, and Y=10. If the coverage enhancement value determined by the first processor 302 is 3 dB, that is, the coverage enhancement value is less than 5 dB, the first processor 302 determines that the PBCH and PHICH can be supported. If the coverage enhancement value determined by the first processor 302 is 8 dB, that is, the coverage enhancement value is greater than 5 dB and less than 10 dB, the first processor 302 determines that the PBCH is supported, that is, the first processor 302 determines that the PHICH is not supported.

Specifically, for another example, the second signal in the transmission signal set 1 is a PUCCH (or a PHICH), and the second signal in the transmission signal set 2 is a null signal, that is, the transmission signal set 2 does not include any signal. The base station or the system specifies in advance: when a coverage enhancement value is greater than 0 dB and less than or equal to X dB, transmission of the second signal in the signal set 1 is supported; when the coverage enhancement value is greater than X dB and less than or equal to Y dB (or is greater than X dB), transmission of the second signal in the signal set 2 is supported. Herein, X and/or Y are/is a predefined feature parameter threshold. For example, it is specified in advance that X=5, and Y=10. If a coverage enhancement value of UE 1 is 3 dB, the UE 1 determines that the coverage enhancement value of the UE 1 is less than 5 dB, and therefore, the UE 1 determines that the PUCCH (or the PHICH) can be supported. If the coverage enhancement value of the UE 1 is 8 dB, the UE 1 determines that the coverage enhancement value of the UE 1 is greater than 5 dB and less than 10 dB (or is greater than 5 dB), and the UE 1 determines that transmission of the signal in the signal set 1 is not supported, that is, the UE 1 determines that the PUCCH (or the PHICH) is not supported.

For example, the preset correspondence, specified by the base station or the system in advance, between a feature parameter and a supported function of the third signal is: when a coverage enhancement value is X dB (or is greater than 0 dB and less than or equal to X dB), the UE supports a function in a first function set of the third signal; when the coverage enhancement value is Y dB (or is greater than X dB, or is greater than X dB and less than or equal to Y dB), the UE supports a function in a second function of the third signal. Herein, X and/or Y are/is a predefined feature threshold.

If the first processor 302 determines that a coverage enhancement value of the UE is X dB (or is greater than 0 dB and less than or equal to X dB), the first processor 302 determines, according to the correspondence between a feature parameter and a supported function of the third signal, that the function in the first function set of the third signal is supported. If the first processor 302 determines that the coverage enhancement value of the UE is Y dB (or is greater than X dB, or is greater than X dB and less than or equal to Y dB), the first processor 302 determines, according to the correspondence between a feature parameter and a supported function of the third signal, that the function in the second function set of the third signal is supported.

More specifically, for example, the third signal is a PUCCH. The base station or the system specifies in advance that functions in a first function set of the PUCCH include a function of reporting channel quality information, a scheduling request function, and a function of feeding back an acknowledgement indicating whether a signal is correctly received; functions in a second function set of the PUCCH include a scheduling request function, and a function of feeding back an acknowledgement indicating whether a signal is correctly received. Besides, the base station or the system specifies in advance: when a coverage enhancement value is greater than 0 dB and less than or equal to X dB, the functions in the first function set of the third signal are supported; when the coverage enhancement value is greater than X dB and less than or equal to Y dB (or is greater than X dB), the functions in the second function set of the third signal are supported. Herein, X and/or Y are/is a predefined feature parameter threshold. For example, it is specified in advance that X=5, and Y=10. If the coverage enhancement value determined by the first processor 302 is 3 dB, that is, the coverage enhancement value is less than 5 dB, the first processor 302 determines that the following functions of the PUCCH are supported: the function of reporting channel quality information, the scheduling request function, and the function of feeding back an acknowledgement indicating whether a signal is correctly received. If the coverage enhancement value determined by the first processor 302 is 8 dB, that is, the coverage enhancement value is greater than 5 dB and less than 10 dB (or is greater than 5 dB), the first processor 302 determines that the scheduling request function and the function of feeding back an acknowledgement indicating whether a signal is correctly received of the PUCCH are supported.

It should be noted that the foregoing description of method implementation of this embodiment is provided by using an example in which the feature parameter is a coverage enhancement value. When the feature parameter is a level, a level index, a quantity of repetition times, an index of a quantity of repetition times, a resource, a resource index, an enhancement level, an enhancement level index, or other information (which reflects communication quality, channel quality, or a service feature), implementation of this embodiment may be performed similarly according to the foregoing description, and details are not described herein again.

In this embodiment, according to a current feature parameter of UE and a preset correspondence, a first processor may adaptively determine a coverage enhancement technology used to transmit a first signal between the UE and a base station, and/or determine a second signal of which transmission is supported between the UE and a base station, and/or determine a supported function of a third signal, thereby adapting to different feature parameters, so as to optimize resource utilization of a system, decrease processing complexity, and reduce power consumption.

Figure 4:
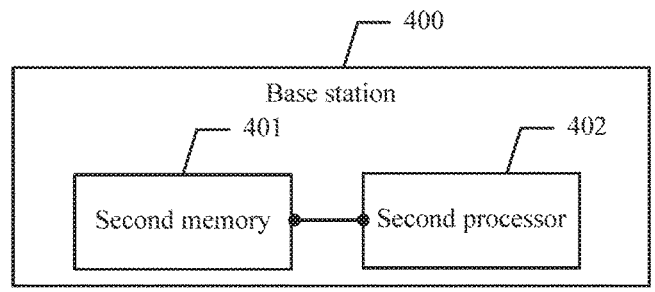
FIG. 4 is a schematic diagram of another embodiment of a base station according to the present invention.

The following describes another embodiment of a base station according to the present invention. Referring to FIG. 4, a base station 400 of this embodiment includes:

a second memory 401, configured to store a preset correspondence; and a second processor 402, configured to determine a feature parameter of UE, where the feature parameter of the UE refers to: a value or information used to measure communication quality of the UE, and/or a value or information used to measure channel quality of the UE, and/or information used to reflect a service feature of the UE; and according to the feature parameter of the UE and the preset correspondence, determine a coverage enhancement technology used by the base station to transmit a first signal, and/or determine a second signal that the base station supports transmitting, and/or determine a function, supported by the base station, of a third signal.

For ease of comprehension, the following describes, by using an actual application scenario, an interaction manner between the units of the base station 400 in this embodiment:

The UE in this embodiment refers to UE that communicates with the base station 400.

A preset correspondence is stored in the second memory 401. In this embodiment, the preset correspondence may be a preset function relationship, a preset table relationship, or a preset specification relationship, and the preset correspondence may be preconfigured by the base station by using signaling or may be preset by a system by using a standard protocol.

The preset correspondence refers to a preset correspondence between a feature parameter and a coverage enhancement technology that is used to transmit the first signal, a preset correspondence between a feature parameter and a second signal of which transmission is supported, and a preset correspondence between a feature parameter and a supported function of the third signal.

Specifically, the preset correspondence between a feature parameter and a coverage enhancement technology that is used to transmit the first signal may be: if the feature parameter is less than or equal to a feature parameter threshold, the base station uses a first coverage enhancement technology to transmit the first signal, and if the feature parameter is greater than the feature parameter threshold, the base station uses a second coverage enhancement technology to transmit the first signal, where both the first coverage enhancement technology and the second coverage enhancement technology are technologies for improving signal transmission reliability, and a main difference between the two lies in that they can implement different converge enhancement intensities.

The preset correspondence between a feature parameter and a second signal of which transmission is supported may be: if the feature parameter is less than or equal to the feature parameter threshold, the base station supports transmitting a second signal in a signal set 1, and if the feature parameter is greater than the feature parameter threshold, the base station supports transmitting a second signal in a signal set 2, where the second signal in the signal set 1 and the second signal in the signal set 2 are different, and the difference herein mainly refers to that the signal set 1 and the second set 2 include different types of second signals, but the signal set 1 and the second set 2 may include a same quantity of or different quantities of second signals.

The preset correspondence between a feature parameter and a supported function of the third signal may be: if the feature parameter is less than or equal to the feature parameter threshold, the base station supports using a function in a first function set of the third signal, and if the feature parameter is greater than the feature parameter threshold, the base station supports using a function in a second function set of the third signal, where the function in the first function set and the function in the second function set are not completely the same.

Besides, the preset correspondence between a feature parameter and a coverage enhancement technology that is used to transmit the first signal may also be: if the feature parameter belongs to a first feature parameter set, the base station uses a first coverage enhancement technology to transmit the first signal, and if the feature parameter belongs to a second feature parameter set, the base station uses a second coverage enhancement technology to transmit the first signal, where both the first coverage enhancement technology and the second coverage enhancement technology are technologies for improving signal transmission reliability, and a main difference between the two lies in that they can implement different coverage enhancement intensities.

The preset correspondence between a feature parameter and a second signal of which transmission is supported may also be: if the feature parameter belongs to the first feature parameter set, the base station supports transmitting a second signal in a signal set 1, and if the feature parameter belongs to the second feature parameter set, the base station supports transmitting a second signal in a signal set 2, where the second signal in the signal set 1 and the second signal in the signal set 2 are different, and the difference herein mainly refers to that the signal set 1 and the second set 2 include different types of second signals, but the signal set 1 and the second set 2 may include a same quantity of or different quantities of second signals.

The preset correspondence between a feature parameter and a supported function of the third signal may also be: if the feature parameter belongs to the first feature parameter set, the base station supports a function in a first function set of the third signal, and if the feature parameter belongs to the second feature parameter set, the base station supports using a function in a second function set of the third signal, where the function in the first function set and the function in the second function set are not completely the same.

The foregoing feature parameter threshold, signal set 1, signal set 2, first function set, second function set, first feature parameter set, and second feature parameter set may be preconfigured by the base station by using signaling or may be preset by the system by using a standard protocol.

For example, the signal set 2 includes fewer signal types than the signal set 1. The signal set 1 or the signal set 2 may be an empty set. The signal set 1 and the signal set 2 may include completely different signals, and in this case, if the base station supports transmission of a signal in the signal set 2, it indicates that the base station does not support transmission of a signal in the signal set 1. The signal set 1 or the signal set 2 includes one or more types of the following signals: a physical downlink control channel, an enhanced physical downlink control channel, a physical random access channel, a physical control format indicator channel, a physical hybrid automatic repeat request indicator channel, a unicast physical downlink shared channel, a broadcast or multicast physical downlink shared channel, a physical uplink shared channel, a physical uplink control channel, a synchronization channel, a physical broadcast channel, a common reference signal, a demodulation reference signal, a dedicated reference signal, a random access response message, a random access response acknowledgment message, a contention resolution message, system information, and a paging message.

In addition, the first function set includes a larger quantity of functions than the second function set. Specifically, for example, the third signal is a PUCCH, and the first function set and the second function set include one or more of the following functions: a function of reporting channel quality information, a scheduling request function, and a function of feeding back an acknowledgement indicating whether a signal is correctly received; however, the second function set includes a smaller quantity of functions than the first function set.

The second processor 402 determines a feature parameter of the UE, where the feature parameter of the UE refers to a value or information used to measure communication quality of the UE, and/or a value or information used to measure channel quality of the UE, and/or information used to reflect a service feature of the UE.

Specifically, the feature parameter of the UE may include at least one of the following: a resource, a resource index, a level, a level index, an enhancement level, an enhancement level index, a repetition level, a repetition level index, a quantity of repetition times, an index of a quantity of repetition times, a coverage enhancement value, an index of a coverage enhancement range, a path loss value, an index of a path loss range, a reference signal received power value, an index of a reference signal received power range, a reference signal received quality value, an index of a reference signal received quality range, a channel quality information value, an index of a channel quality information range, a service type, an index of a service type, a power saving requirement, an index of a power saving requirement, a delay requirement, an index of a delay requirement, a quantity of times of detecting a pre-specified channel, an index of a quantity of times of detecting a pre-specified channel, a mobility requirement, and an index of a mobility requirement.

The second processor 402 may determine the feature parameter of the UE according to received signaling that indicates the feature parameter of the UE, where the signaling may be sent by the UE or another network entity to the base station. Alternatively, the second processor 402 determines the feature parameter of the UE according to whether an uplink signal can be correctly received. For example, the base station sends a downlink signal to the UE, and if the base station can correctly receive a corresponding uplink signal that is fed back by the UE, the second processor 402 can determine a current feature parameter of the UE (for example, a feature parameter that represents current communication quality). Alternatively, the second processor 402 determines the feature parameter of the UE by measuring a received uplink signal. Alternatively, the second processor 402 determines the feature parameter of the UE autonomously.

After determining the feature parameter of the UE, according to the feature parameter of the UE and the preset correspondence, the second processor 402 determines a coverage enhancement technology used by the base station to transmit a first signal, and/or determines a second signal that the base station supports transmitting, and/or determines a function, supported by the base station, of a third signal.

After the second processor 402 determines the feature parameter of the UE, the second processor 402 may determine, according to the preset correspondence between a feature parameter and a coverage enhancement technology that is used to transmit the first signal, a coverage enhancement technology that is used to transmit the first signal and that corresponds to the feature parameter of the UE; and/or the second processor 402 determines, according to the preset correspondence between a feature parameter and a second signal of which transmission is supported, a second signal to which the feature parameter of the UE corresponds, wherein transmission of the second signal is supported by the feature parameter; and/or the second processor 402 determines, according to the preset correspondence between a feature parameter and a supported function of the third signal, a supported function that is corresponding to the feature parameter of the UE and is of the third signal.

The first signal, the second signal, and the third signal herein may be the same or may be different. That is, the first signal and the second signal may be the same or may be different; the first signal and the third signal may be the same or may be different; and the second signal and the third signal may be the same or may be different.

The first signal, the second signal, or the third signal includes at least one of the following:

a physical downlink control channel, an enhanced physical downlink control channel, a physical random access channel, a physical control format indicator channel, a physical hybrid automatic repeat request indicator channel, a unicast physical downlink shared channel, a broadcast or multicast physical downlink shared channel, a physical uplink shared channel, a physical uplink control channel, a synchronization channel, a physical broadcast channel, a common reference signal, a demodulation reference signal, a dedicated reference signal, a random access response message, a random access response acknowledgment message, a contention resolution message, system information, and a paging message.

The "transmission" in this embodiment refers to sending or receiving. The "transmit" in this embodiment refers to send or receive.

By using an example in which the feature parameter of the UE is a coverage enhancement value, the following describes determining, by the base station according to the feature parameter of the UE and the preset correspondence, the coverage enhancement technology used by the base station to transmit the first signal, and/or determining the second signal that the base station supports transmitting, and/or determining the function, supported by the base station, of the third signal.

For example, the preset correspondence, specified by the base station or the system in advance, between a feature parameter and a coverage enhancement technology that is used to transmit the first signal is: when a coverage enhancement value is X dB (or is greater than 0 dB and less than or equal to X dB), a first coverage enhancement technology is used to transmit the first signal; when the coverage enhancement value is Y dB (or is greater than X dB, or is greater than X dB and less than or equal to Y dB), a second coverage enhancement technology is used to transmit the first signal. Herein, X and/or Y are/is a predefined feature threshold.

If the second processor 402 determines that a coverage enhancement value of UE is X dB (or is greater than 0 dB and less than or equal to X dB), the second processor 402 determines, according to the correspondence between a feature parameter and a coverage enhancement technology that is used to transmit the first signal, that the first coverage enhancement technology is used to transmit the first signal during communication with the UE. If the second processor 402 determines that the coverage enhancement value of the UE is Y dB (or is greater than X dB, or is greater than X dB and less than or equal to Y dB), the second processor 402 determines, according to the correspondence between a feature parameter and a coverage enhancement technology that is used to transmit the first signal, that the second coverage enhancement technology is used to transmit the first signal during communication with the UE.

In this embodiment, the first coverage enhancement technology and the second coverage enhancement technology may be one of or a combination of multiple of the following technologies: retransmission, spread spectrum transmission, low bit-rate transmission, transmission time interval bundling (TTI bundling) transmission, power boosting (power boosting), power spectrum density boosting (PSD boosting), keep trying (keep trying), relaxing requirement, frequency hopping, and maximum likelihood detection.

More specifically, for example, the first signal is a physical uplink control channel PUCCH, and the base station or the system specifies in advance: when a coverage enhancement value is greater than 0 dB and less than or equal to X dB, the relaxing requirement (and/or frequency hopping) is used to perform PUCCH coverage enhancement; when the coverage enhancement value is greater than X dB and less than or equal to Y dB (or is greater than X dB), the relaxing requirement (and/or frequency hopping) and repeated transmission are used to perform PUCCH coverage enhancement. Herein, X and/or Y are/is a predefined feature parameter threshold. For example, it is specified in advance that X=5, and Y=10. If the second processor 402 determines that a coverage enhancement value of UE 1 is 3 dB, that is, the coverage enhancement value is less than 5 dB, the second processor 402 determines that the relaxing requirement (and/or frequency hopping) is used to perform PUCCH coverage enhancement for the PUCCH, and the second processor 402 correspondingly receives the PUCCH in this manner. If the second processor 402 determines that a coverage enhancement value of UE 2 is 8 dB, that is, the coverage enhancement value is greater than 5 dB and less than 10 dB (or is greater than 5 dB), the second processor 402 determines that the relaxing requirement (and/or frequency hopping) and repeated transmission are used to perform PUCCH coverage enhancement for the PUCCH, and the second processor 402 correspondingly receives the PUCCH in this manner.

Specifically, for another example, the first signal is a physical broadcast channel PBCH, and the base station or the system specifies in advance: when a coverage enhancement value is not greater than C dB, keep trying is used to perform PBCH coverage enhancement; when the coverage enhancement value is not greater than D dB, keep trying and retransmission are used to perform PBCH coverage enhancement. Herein, C and/or D are/is a predefined feature parameter threshold. For example, it is specified in advance that C=10, and D=15. If the second processor 402 determines that a current coverage enhancement value of UE (one UE or multiple UEs) is not greater than 10 dB, the second processor 402 determines that keep trying is used to perform PBCH coverage enhancement for the PBCH. If the second processor 402 determines that a current coverage enhancement value of UE (one UE or multiple UEs) is not greater than 15 dB, the second processor 402 determines that keep trying and retransmission are used to perform PBCH coverage enhancement for the PBCH.

For example, the preset correspondence, specified by the base station or the system in advance, between a feature parameter and a second signal of which transmission is supported is: when a coverage enhancement value is X dB (or is greater than 0 dB and less than or equal to X dB), the base station supports transmitting a second signal in a signal set 1; when the coverage enhancement value is Y dB (or is greater than X dB, or is greater than X dB and less than or equal to Y dB), the base station supports transmitting a second signal in a signal set 2. Herein, X and/or Y are/is a predefined feature threshold.

If the second processor 402 determines that a coverage enhancement value of UE is X dB (or is greater than 0 dB and less than or equal to X dB), the second processor 402 determines, according to the correspondence between a feature parameter and a second signal of which transmission is supported, that transmission of the second signal in the signal set 1 is supported during communication with the UE. If the second processor 402 determines that the coverage enhancement value of the UE is Y dB (or is greater than X dB, or is greater than X dB and less than or equal to Y dB), the second processor 402 determines, according to the correspondence between a feature parameter and a second signal of which transmission is supported, that transmission of the second signal in the signal set 2 is supported during communication with the UE.

More specifically, for example, the second signal in the transmission signal set 1 is a PBCH and a physical hybrid automatic repeat request indicator channel PHICH, and the second signal in the signal set 2 is a PBCH. The base station or the system specifies in advance: when a coverage enhancement value is greater than 0 dB and less than or equal to X dB, transmission of the second signal in the signal set 1 is supported; when the coverage enhancement value is greater than X dB and less than or equal to Y dB (or is greater than X dB), transmission of the second signal in the signal set 2 is supported. Herein, X and/or Y are/is a predefined feature parameter threshold. For example, it is specified in advance that X=5, and Y=10. If a coverage enhancement value of UE 1 is 3 dB, the second processor 402 determines that the coverage enhancement value of the UE 1 is less than 5 dB, and therefore, the second processor 402 determines that the PBCH and the PHICH can be supported during communication with the UE 1. If the second processor 402 determines that a coverage enhancement value of UE 2 is 8 dB, that is, the coverage enhancement value of the UE 2 is greater than 5 dB and less than 10 dB, the second processor 402 determines that the PBCH is supported during communication with the UE 2, that is, it is determined the PHICH is not supported during communication with the UE 2.

Specifically, for another example, the second signal in the transmission signal set 1 is a PUCCH (or a PHICH), and the second signal in the transmission signal set 2 is a null signal, that is, the transmission signal set 2 does not include any signal. The base station or the system specifies in advance that when a coverage enhancement value is greater than 0 dB and less than or equal to X dB, transmission of the second signal in the signal set 1 is supported; and when the coverage enhancement value is greater than X dB and less than or equal to Y dB (or is greater than X dB), transmission of the second signal in the signal set 2 is supported. Herein, X and/or Y are/is a predefined feature parameter threshold. For example, it is specified in advance that X=5, and Y=10. If the second processor 402 determines that a coverage enhancement value of UE 1 is 3 dB, that is, it is determined that the coverage enhancement value of the UE 1 is less than 5 dB, the second processor 402 determines that the PUCCH (or the PHICH) can be supported during communication with the UE 1. If the second processor 402 determines that the coverage enhancement value of the UE 1 is 8 dB, that is, the coverage enhancement value is greater than 5 dB and less than 10 dB (or is greater than 5 dB), the second processor 402 determines that transmission of the signal in the signal set 1 is not supported during communication with the UE 1, that is, the PUCCH (or the PHICH) is not supported during communication between the base station and the UE 1.

For example, the preset correspondence, specified by the base station or the system in advance, between a feature parameter and a supported function of the third signal is: when a coverage enhancement value is X dB (or is greater than 0 dB and less than or equal to X dB), the base station supports a function in a first function set of the third signal; when the coverage enhancement value is Y dB (or is greater than X dB, or is greater than X dB and less than or equal to Y dB), the base station supports a function in a second function of the third signal. Herein, X and/or Y are/is a predefined feature threshold.

If the second processor 402 determines that a coverage enhancement value of UE is X dB (or is greater than 0 dB and less than or equal to X dB), the second processor 402 determines, according to the correspondence between a feature parameter and a supported function of the third signal, that the function in the first function set of the third signal is supported. If the second processor 402 determines that the coverage enhancement value of the UE is Y dB (or is greater than X dB, or is greater than X dB and less than or equal to Y dB), the second processor 402 determines, according to the correspondence between a feature parameter and a supported function of the third signal, that the function in the second function set of the third signal is supported.

More specifically, for example, the third signal is a PUCCH. The base station or the system specifies in advance that functions in a first function set of the PUCCH include a function of reporting channel quality information, a scheduling request function, and a function of feeding back an acknowledgement indicating whether a signal is correctly received; functions in a second function set of the PUCCH include a scheduling request function, and a function of feeding back an acknowledgement indicating whether a signal is correctly received. Besides, the base station or the system specifies in advance: when a coverage enhancement value is greater than 0 dB and less than or equal to X dB, the functions in the first function set of the third signal are supported; when the coverage enhancement value is greater than X dB and less than or equal to Y dB (or is greater than X dB), the functions in the second function set of the third signal are supported. Herein, X and/or Y are/is a predefined feature parameter threshold. For example, it is specified in advance that X=5, and Y=10. If the second processor 402 determines that a coverage enhancement value of UE 1 is 3 dB, that is, it is determined that the coverage enhancement value of the UE 1 is less than 5 dB, the second processor 402 determines that the following functions of the PUCCH are supported during communication with the UE 1: the function of reporting channel quality information, the scheduling request function, and the function of feeding back an acknowledgement indicating whether a signal is correctly received. If the second processor 402 determines that the coverage enhancement value of the UE 1 is 8 dB, that is, it is determined that the coverage enhancement value of the UE 1 is greater than 5 dB and less than 10 dB (or is greater than 5 dB), the second processor 402 determines that the scheduling request function and the function of feeding back an acknowledgement indicating whether a signal is correctly received of the PUCCH are supported during communication with the UE 1.

It should be noted that the foregoing description of method implementation of this embodiment is provided by using an example in which the feature parameter is a coverage enhancement value. When the feature parameter is a level, a level index, a quantity of repetition times, an index of a quantity of repetition times, a resource, a resource index, an enhancement level, an enhancement level index, or other information (which reflects communication quality, channel quality, or a service feature), implementation of this embodiment may be performed similarly according to the foregoing description, and details are not described herein again.

In this embodiment, according to a current feature parameter of UE and a preset correspondence, a second processor may adaptively determine a coverage enhancement technology used to transmit a first signal between the UE and the base station, and/or determine a second signal of which transmission is supported between the UE and the base station, and/or determine a supported function of a third signal, thereby adapting to different feature parameters of the UE, so as to optimize resource utilization of a system, decrease processing complexity, and reduce power consumption.

Figure 5:
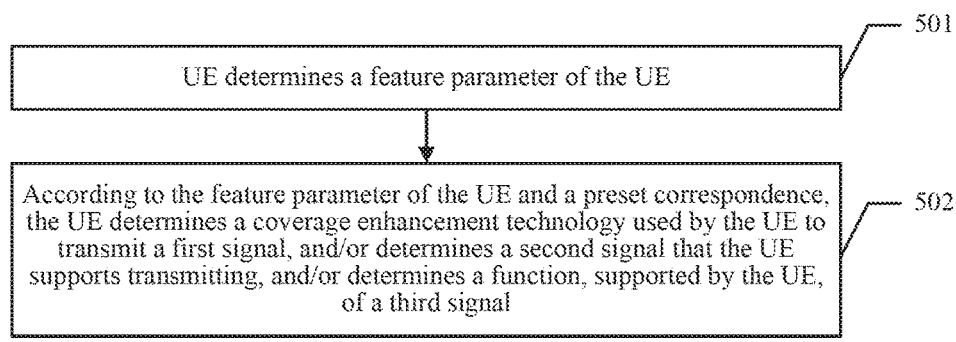
FIG. 5 is a schematic diagram of an embodiment of a signal transmission method according to the present invention.

The following describes a signal transmission method provided by the present invention. Referring to FIG. 5, the method can be applied to the UE provided in FIG. 1 or FIG. 3, and an embodiment of the signal transmission method of the present invention includes:

501: UE determines a feature parameter of the UE.

In this embodiment, the feature parameter of the UE refers to a value or information used to measure communication quality of the UE, and/or a value or information used to measure channel quality of the UE, and/or information used to reflect a service feature of the UE.

Specifically, the feature parameter of the UE may include at least one of the following: a resource, a resource index, a level, a level index, an enhancement level, an enhancement level index, a repetition level, a repetition level index, a quantity of repetition times, an index of a quantity of repetition times, a coverage enhancement value, an index of a coverage enhancement range, a path loss value, an index of a path loss range, a reference signal received power value, an index of a reference signal received power range, a reference signal received quality value, an index of a reference signal received quality range, a channel quality information value, an index of a channel quality information range, a service type, an index of a service type, a power saving requirement, an index of a power saving requirement, a delay requirement, an index of a delay requirement, a quantity of times of detecting a pre-specified channel, an index of a quantity of times of detecting a pre-specified channel, a mobility requirement, and an index of a mobility requirement.

The UE may determine the feature parameter of the UE according to received signaling that indicates the feature parameter of the UE, where the signaling may be sent by another UE to the UE of this embodiment, or may be sent by a base station or another network entity to the UE. Alternatively, the UE determines the feature parameter of the UE according to whether a downlink signal can be correctly received. For example, the UE sends an uplink signal to a base station, and if the UE can correctly receive a corresponding downlink signal that is fed back by the base station, the UE can determine a current feature parameter of the UE (for example, a feature parameter that represents current communication quality). Alternatively, the UE determines the feature parameter of the UE by measuring a received downlink signal. Alternatively, the UE determines the feature parameter of the UE autonomously.

502: According to the feature parameter of the UE and a preset correspondence, the UE determines a coverage enhancement technology used by the UE to transmit a first signal, and/or determines a second signal that the UE supports transmitting, and/or determines a function, supported by the UE, of a third signal.

In this embodiment, the preset correspondence may be a preset function relationship, a preset table relationship, or a preset specification relationship, and the preset correspondence may be preconfigured by a base station by using signaling or may be preset by a system by using a standard protocol.

The preset correspondence refers to a preset correspondence between a feature parameter and a coverage enhancement technology that is used to transmit the first signal, a preset correspondence between a feature parameter and a second signal of which transmission is supported, and a preset correspondence between a feature parameter and a supported function of the third signal.

Specifically, the preset correspondence between a feature parameter and a coverage enhancement technology that is used to transmit the first signal may be: if the feature parameter is less than or equal to a feature parameter threshold, the UE uses a first coverage enhancement technology to transmit the first signal, and if the feature parameter is greater than the feature parameter threshold, the UE uses a second coverage enhancement technology to transmit the first signal, where both the first coverage enhancement technology and the second coverage enhancement technology are technologies for improving signal transmission reliability, and a main difference between the two lies in that they can implement different converge enhancement intensities.

The preset correspondence between a feature parameter and a second signal of which transmission is supported may be: if the feature parameter is less than or equal to the feature parameter threshold, the UE supports transmitting a second signal in a signal set 1, and if the feature parameter is greater than the feature parameter threshold, the UE supports transmitting a second signal in a signal set 2, where the second signal in the signal set 1 and the second signal in the signal set 2 are different, and the difference herein mainly refers to that the signal set 1 and the second set 2 include different types of second signals, but the signal set 1 and the signal set 2 may include a same quantity of or different quantities of second signals.

The preset correspondence between a feature parameter and a supported function of the third signal may be: if the feature parameter is less than or equal to the feature parameter threshold, the UE supports using a function in a first function set of the third signal, and if the feature parameter is greater than the feature parameter threshold, the UE supports using a function in a second function set of the third signal, where the function in the first function set and the function in the second function set are not completely the same.

Besides, the preset correspondence between a feature parameter and a coverage enhancement technology that is used to transmit the first signal may also be: if the feature parameter belongs to a first feature parameter set, the UE uses a first coverage enhancement technology to transmit the first signal, and if the feature parameter belongs to a second feature parameter set, the UE uses a second coverage enhancement technology to transmit the first signal, where both the first coverage enhancement technology and the second coverage enhancement technology are technologies for improving signal transmission reliability, and a main difference between the two lies in that they can implement different coverage enhancement intensities.

The preset correspondence between a feature parameter and a second signal of which transmission is supported may also be: if the feature parameter belongs to the first feature parameter set, the UE supports transmitting a second signal in a signal set 1, and if the feature parameter belongs to the second feature parameter set, the UE supports transmitting a second signal in a signal set 2, where the second signal in the signal set 1 and the second signal in the signal set 2 are different, and the difference herein mainly refers to that the signal set 1 and the second set 2 include different types of second signals, but the signal set 1 and the second set 2 may include a same quantity of or different quantities of second signals.

The preset correspondence between a feature parameter and a supported function of the third signal may also be: if the feature parameter belongs to the first feature parameter set, the UE supports a function in a first function set of the third signal, and if the feature parameter belongs to the second feature parameter set, the UE supports using a function in a second function set of the third signal, where the function in the first function set and the function in the second function set are not completely the same.

The foregoing feature parameter threshold, signal set 1, signal set 2, first function set, second function set, first feature parameter set, and second feature parameter set may be preconfigured by the base station by using signaling or may be preset by the system by using a standard protocol.

For example, the signal set 2 includes fewer signal types than the signal set 1. The signal set 1 or the signal set 2 may be an empty set. The signal set 1 and the signal set 2 may include completely different signals, and in this case, if the UE supports transmission of a signal in the signal set 2, it indicates that the UE does not support transmission of a signal in the signal set 1. The signal set 1 or the signal set 2 includes one or more types of the following signals: a physical downlink control channel, an enhanced physical downlink control channel, a physical random access channel, a physical control format indicator channel, a physical hybrid automatic repeat request indicator channel, a unicast physical downlink shared channel, a broadcast or multicast physical downlink shared channel, a physical uplink shared channel, a physical uplink control channel, a synchronization channel, a physical broadcast channel, a common reference signal, a demodulation reference signal, a dedicated reference signal, a random access response message, a random access response acknowledgment message, a contention resolution message, system information, and a paging message.

In addition, the first function set includes a larger quantity of functions than the second function set. Specifically, for example, the third signal is a PUCCH, and the first function set and the second function set include one or more of the following functions: a function of reporting channel quality information, a scheduling request function, and a function of feeding back an acknowledgement indicating whether a signal is correctly received; however, the second function set includes a smaller quantity of functions than the first function set.

After determining the feature parameter of the UE, the UE may determine, according to the preset correspondence between a feature parameter and a coverage enhancement technology that is used to transmit the first signal, a coverage enhancement technology that is used to transmit the first signal and that corresponds to the feature parameter of the UE; and/or the UE determines, according to a preset correspondence between a feature parameter and a second signal of which transmission is supported, a second signal to which the feature parameter of the UE corresponds, wherein transmission of the second signal is supported by the feature parameter; and/or the UE determines, according to the preset correspondence between a feature parameter and a supported function of the third signal, a supported function that is corresponding to the feature parameter of the UE and is of the third signal.

The first signal, the second signal, and the third signal herein may be the same or may be different. That is, the first signal and the second signal may be the same or may be different; the first signal and the third signal may be the same or may be different; and the second signal and the third signal may be the same or may be different.

The first signal, the second signal, or the third signal includes at least one of the following:

a physical downlink control channel, an enhanced physical downlink control channel, a physical random access channel, a physical control format indicator channel, a physical hybrid automatic repeat request indicator channel, a unicast physical downlink shared channel, a broadcast or multicast physical downlink shared channel, a physical uplink shared channel, a physical uplink control channel, a synchronization channel, a physical broadcast channel, a common reference signal, a demodulation reference signal, a dedicated reference signal, a random access response message, a random access response acknowledgment message, a contention resolution message, system information, and a paging message.

By using an example in which the feature parameter of the UE is a coverage enhancement value, the following describes determining, by the UE according to the feature parameter of the UE and the preset correspondence, the coverage enhancement technology used by the UE to transmit the first signal, and/or determining the second signal that the UE supports transmitting, and/or determining the function, supported by the UE, of the third signal.

For example, the preset correspondence, specified by the base station or the system in advance, between a feature parameter and a coverage enhancement technology that is used to transmit the first signal is: when a coverage enhancement value is X dB (or is greater than 0 dB and less than or equal to X dB), a first coverage enhancement technology is used to transmit the first signal; when the coverage enhancement value is Y dB (or is greater than X dB, or is greater than X dB and less than or equal to Y dB), a second coverage enhancement technology is used to transmit the first signal. Herein, X and/or Y are/is a predefined feature threshold.

If the UE determines that a coverage enhancement value of the UE is X dB (or is greater than 0 dB and less than or equal to X dB), the UE determines, according to the correspondence between a feature parameter and a coverage enhancement technology that is used to transmit the first signal, that the first coverage enhancement technology is used to transmit the first signal. If the UE determines that the coverage enhancement value of the UE is Y dB (or is greater than X dB, or is greater than X dB and less than or equal to Y dB), the UE determines, according to the correspondence between a feature parameter and a coverage enhancement technology that is used to transmit the first signal, that the second coverage enhancement technology is used to transmit the first signal.

In this embodiment, the first coverage enhancement technology and the second coverage enhancement technology may be one of or a combination of multiple of the following technologies: retransmission, spread spectrum transmission, low bit-rate transmission, transmission time interval bundling (TTI bundling) transmission, power boosting (power boosting), power spectrum density boosting (PSD boosting), keep trying (keep trying), relaxing requirement, frequency hopping, and maximum likelihood detection.

More specifically, for example, the first signal is a physical uplink control channel PUCCH, and the base station or the system specifies in advance: when a coverage enhancement value is greater than 0 dB and less than or equal to X dB, the relaxing requirement (and/or frequency hopping) is used to perform PUCCH coverage enhancement; when the coverage enhancement value is greater than X dB and less than or equal to Y dB (or is greater than X dB), the relaxing requirement (and/or frequency hopping) and repeated transmission are used to perform PUCCH coverage enhancement. Herein, X and/or Y are/is a predefined feature parameter threshold. For example, it is specified in advance that X=5, and Y=10. If a coverage enhancement value of UE 1 is 3 dB, the UE 1 determines that the coverage enhancement value of the UE 1 is less than 5 dB, and therefore, the UE 1 determines that the relaxing requirement (and/or frequency hopping) is used to perform PUCCH coverage enhancement for the PUCCH. If a coverage enhancement value of UE 2 is 8 dB, that is, the UE 2 determines that the coverage enhancement value of the UE 2 is greater than 5 dB and less than 10 dB (or is greater than 5 dB), the UE 2 determines that the relaxing requirement (and/or frequency hopping) and repeated transmission are used to perform PUCCH coverage enhancement for the PUCCH.

Specifically, for another example, the first signal is a physical broadcast channel PBCH, and the base station or the system specifies in advance: when a coverage enhancement value is C dB, keep trying is used to perform PBCH coverage enhancement; when the coverage enhancement value is D dB, keep trying and retransmission are used to perform PBCH coverage enhancement. Herein, C and/or D are/is a predefined feature parameter threshold. For example, it is specified in advance that C=10, and D=15. If UE 1 determines that a coverage enhancement value of the UE 1 is 10 dB, the UE 1 determines that keep trying is used to perform PBCH coverage enhancement for the PBCH, and the UE 1 keeps trying PBCH detection to detect the PBCH. If the UE 1 determines that the coverage enhancement value of the UE 1 is 15 dB, the UE 1 determines that keep trying and retransmission are used to perform PBCH coverage enhancement for the PBCH, and the UE 1 keeps trying repetition of PBCH detection to detect the PBCH.

For example, the preset correspondence, specified by the base station or the system in advance, between a feature parameter and a second signal of which transmission is supported is: when a coverage enhancement value is X dB (or is greater than 0 dB and less than or equal to X dB), the UE supports transmitting a second signal in a signal set 1; when the coverage enhancement value is Y dB (or is greater than X dB, or is greater than X dB and less than or equal to Y dB), the UE supports transmitting a second signal in a signal set 2. Herein, X and/or Y are/is a predefined feature threshold.

If the UE determines that the coverage enhancement value of the UE is X dB (or is greater than 0 dB and less than or equal to X dB), the UE determines, according to the correspondence between a feature parameter and a second signal of which transmission is supported, that transmission of the second signal in the signal set 1 is supported. If the UE determines that the coverage enhancement value of the UE is Y dB (or is greater than X dB, or is greater than X dB and less than or equal to Y dB), the UE determines, according to the correspondence between a feature parameter and a second signal of which transmission is supported, that transmission of the second signal in the signal set 2 is supported.

More specifically, for example, the second signal in the transmission signal set 1 is a PBCH and a physical hybrid automatic repeat request indicator channel PHICH, and the second signal in the signal set 2 is a PBCH. The base station or the system specifies in advance: when a coverage enhancement value is greater than 0 dB and less than or equal to X dB, transmission of the second signal in the transmission signal set 1 is supported; when the coverage enhancement value is greater than X dB and less than or equal to Y dB (or is greater than X dB), transmission of the second signal in the signal set 2 is supported. Herein, X and/or Y are/is a predefined feature parameter threshold. For example, it is specified in advance that X=5, and Y=10. If a coverage enhancement value of UE 1 is 3 dB, the UE 1 determines that the coverage enhancement value of the UE 1 is less than 5 dB, and therefore, the UE 1 determines that the PBCH and the PHICH can be supported. If a coverage enhancement value of UE 2 is 8 dB, the UE 2 determines that the coverage enhancement value of the UE 2 is greater than 5 dB and less than 10 dB, and the UE 2 determines that the PBCH is supported, that is, the UE 2 determines that the PHICH is not supported.

Specifically, for another example, the second signal in the transmission signal set 1 is a PUCCH (or a PHICH), and the second signal in the transmission signal set 2 is a null signal, that is, the transmission signal set 2 does not include any signal. The base station or the system specifies in advance: when a coverage enhancement value is greater than 0 dB and less than or equal to X dB, transmission of the second signal in the signal set 1 is supported; when the coverage enhancement value is greater than X dB and less than or equal to Y dB (or is greater than X dB), transmission of the second signal in the signal set 2 is supported. Herein, X and/or Y are/is a predefined feature parameter threshold. For example, it is specified in advance that X=5, and Y=10. If a coverage enhancement value of UE 1 is 3 dB, the UE 1 determines that the coverage enhancement value of the UE 1 is less than 5 dB, and therefore, the UE 1 determines that the PUCCH (or the PHICH) can be supported. If the coverage enhancement value of the UE 1 is 8 dB, the UE 1 determines that the coverage enhancement value of the UE 1 is greater than 5 dB and less than 10 dB (or is greater than 5 dB), and the UE 1 determines that transmission of the signal in the signal set 1 is not supported, that is, the UE 1 determines that the PUCCH (or the PHICH) is not supported.

For example, the preset correspondence, specified by the base station or the system in advance, between a feature parameter and a supported function of the third signal is: when a coverage enhancement value is X dB (or is greater than 0 dB and less than or equal to X dB), the UE supports a function in a first function set of the third signal; when the coverage enhancement value is Y dB (or is greater than X dB, or is greater than X dB and less than or equal to Y dB), the UE supports a function in a second function of the third signal. Herein, X and/or Y are/is a predefined feature threshold.

If the UE determines that the coverage enhancement value of the UE is X dB (or is greater than 0 dB and less than or equal to X dB), the UE determines, according to the correspondence between a feature parameter and a supported function of the third signal, that the function in the first function set of the third signal is supported. If the UE determines that the coverage enhancement value of the UE is Y dB (or is greater than X dB, or is greater than X dB and less than or equal to Y dB), the UE determines, according to the correspondence between a feature parameter and a supported function of the third signal, that the function in the second function set of the third signal is supported.

More specifically, for example, the third signal is a PUCCH. The base station or the system specifies in advance that functions in a first function set of the PUCCH include a function of reporting channel quality information, a scheduling request function, and a function of feeding back an acknowledgement indicating whether a signal is correctly received; functions in a second function set of the PUCCH include a scheduling request function, and a function of feeding back an acknowledgement indicating whether a signal is correctly received. Besides, the base station or the system specifies in advance: when a coverage enhancement value is greater than 0 dB and less than or equal to X dB, the functions in the first function set of the third signal are supported; when the coverage enhancement value is greater than X dB and less than or equal to Y dB (or is greater than X dB), the functions in the second function set of the third signal are supported. Herein, X and/or Y are/is a predefined feature parameter threshold. For example, it is specified in advance that X=5, and Y=10. If a coverage enhancement value of UE 1 is 3 dB, that is, the UE 1 determines that the coverage enhancement value of UE 1 is less than 5 dB, the UE 1 determines that the following functions of the PUCCH are supported: the function of reporting channel quality information, the scheduling request function, and the function of feeding back an acknowledgement indicating whether a signal is correctly received. If the coverage enhancement value of the UE 1 is 8 dB, that is, the UE 1 determines that the coverage enhancement value of the UE 1 is greater than 5 dB and less than 10 dB (or is greater than 5 dB), the UE 1 determines to support the scheduling request function and the function of feeding back an acknowledgement indicating whether a signal is correctly received of the PUCCH.

It should be noted that the foregoing description of method implementation of this embodiment is provided by using an example in which the feature parameter is a coverage enhancement value. When the feature parameter is a level, a level index, a quantity of repetition times, an index of a quantity of repetition times, a resource, a resource index, an enhancement level, an enhancement level index, or other information (which reflects communication quality, channel quality, or a service feature), implementation of this embodiment may be performed similarly according to the foregoing description, and details are not described herein again.

The "transmission" in this embodiment refers to sending or receiving. The "transmit" in this embodiment refers to send or receive.

In this embodiment, according to a current feature parameter of UE and a preset correspondence, the UE may adaptively determine a coverage enhancement technology used to transmit a first signal between the UE and a base station, and/or determine a second signal of which transmission is supported between the UE and a base station, and/or determine a supported function of a third signal, thereby adapting to different feature parameters, so as to optimize resource utilization of a system, decrease processing complexity, and reduce power consumption.

Figure 6:
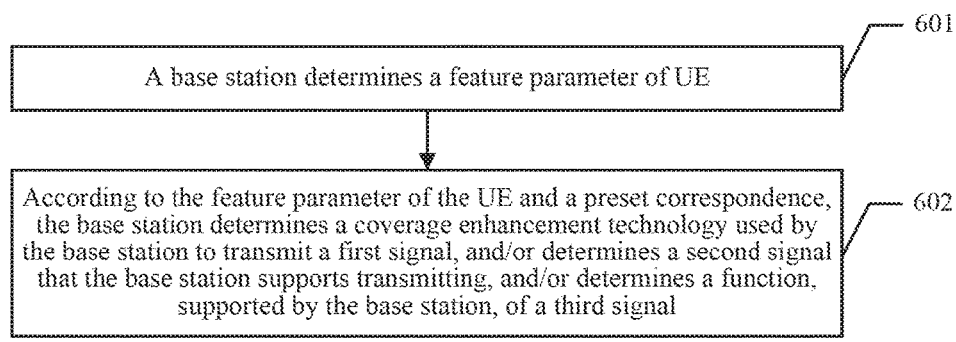
FIG. 6 is a schematic diagram of another embodiment of a signal transmission method according to the present invention.

The following describes another embodiment of a signal transmission method provided by the present invention. Referring to FIG. 6, the method can be applied to the base station provided in FIG. 2 or FIG. 4, and the signal transmission method of this embodiment includes:

601: A base station determines a feature parameter of UE.

The UE in this embodiment refers to UE that communicates with the base station; in this embodiment, the feature parameter of the UE refers to a value or information used to measure communication quality of the UE, and/or a value or information used to measure channel quality of the UE, and/or information used to reflect a service feature of the UE.

Specifically, the feature parameter of the UE may include at least one of the following: a resource, a resource index, a level, a level index, an enhancement level, an enhancement level index, a repetition level, a repetition level index, a quantity of repetition times, an index of a quantity of repetition times, a coverage enhancement value, an index of a coverage enhancement range, a path loss value, an index of a path loss range, a reference signal received power value, an index of a reference signal received power range, a reference signal received quality value, an index of a reference signal received quality range, a channel quality information value, an index of a channel quality information range, a service type, an index of a service type, a power saving requirement, an index of a power saving requirement, a delay requirement, an index of a delay requirement, a quantity of times of detecting a pre-specified channel, an index of a quantity of times of detecting a pre-specified channel, a mobility requirement, and an index of a mobility requirement.

The base station may determine the feature parameter of the UE according to received signaling that indicates the feature parameter of the UE, where the signaling may be sent by the UE or another network entity to the base station. Alternatively, the base station determines the feature parameter of the UE according to whether an uplink signal can be correctly received. For example, the base station sends a downlink signal to the UE, and if the base station can correctly receive a corresponding uplink signal that is fed back by the UE, the base station can determine a current feature parameter of the UE (for example, a feature parameter that represents current communication quality). Alternatively, the base station determines the feature parameter of the UE by measuring a received uplink signal. Alternatively, the base station determines the feature parameter of the UE autonomously.

602: According to the feature parameter of the UE and a preset correspondence, the base station determines a coverage enhancement technology used by the base station to transmit a first signal, and/or determines a second signal that the base station supports transmitting, and/or determines a function, supported by the base station, of a third signal.

In this embodiment, the preset correspondence may be a preset function relationship, a preset table relationship, or a preset specification relationship, and the preset correspondence may be preconfigured by the base station by using signaling or may be preset by a system by using a standard protocol.

The preset correspondence refers to a preset correspondence between a feature parameter and a coverage enhancement technology that is used to transmit the first signal, a preset correspondence between a feature parameter and a second signal of which transmission is supported, and a preset correspondence between a feature parameter and a supported function of the third signal.

Specifically, the preset correspondence between a feature parameter and a coverage enhancement technology that is used to transmit the first signal may be: if the feature parameter is less than or equal to a feature parameter threshold, the base station uses a first coverage enhancement technology to transmit the first signal, and if the feature parameter is greater than the feature parameter threshold, the base station uses a second coverage enhancement technology to transmit the first signal, where both the first coverage enhancement technology and the second coverage enhancement technology are technologies for improving signal transmission reliability, and a main difference between the two lies in that they can implement different converge enhancement intensities.

The preset correspondence between a feature parameter and a second signal of which transmission is supported may be: if the feature parameter is less than or equal to the feature parameter threshold, the base station supports transmitting a second signal in a signal set 1, and if the feature parameter is greater than the feature parameter threshold, the base station supports transmitting a second signal in a signal set 2, where the second signal in the signal set 1 and the second signal in the signal set 2 are different, and the difference herein mainly refers to that the signal set 1 and the second set 2 include different types of second signals, but the signal set 1 and the second set 2 may include a same quantity of or different quantities of second signals.

The preset correspondence between a feature parameter and a supported function of the third signal may be: if the feature parameter is less than or equal to the feature parameter threshold, the base station supports using a function in a first function set of the third signal, and if the feature parameter is greater than the feature parameter threshold, the base station supports using a function in a second function set of the third signal, where the function in the first function set and the function in the second function set are not completely the same.

Besides, the preset correspondence between a feature parameter and a coverage enhancement technology that is used to transmit the first signal may also be: if the feature parameter belongs to a first feature parameter set, the base station uses a first coverage enhancement technology to transmit the first signal, and if the feature parameter belongs to a second feature parameter set, the base station uses a second coverage enhancement technology to transmit the first signal, where both the first coverage enhancement technology and the second coverage enhancement technology are technologies for improving signal transmission reliability, and a main difference between the two lies in that they can implement different coverage enhancement intensities.

The preset correspondence between a feature parameter and a second signal of which transmission is supported may also be: if the feature parameter belongs to the first feature parameter set, the base station supports transmitting a second signal in a signal set 1, and if the feature parameter belongs to the second feature parameter set, the base station supports transmitting a second signal in a signal set 2, where the second signal in the signal set 1 and the second signal in the signal set 2 are different, and the difference herein mainly refers to that the signal set 1 and the second set 2 include different types of second signals, but the signal set 1 and the second set 2 may include a same quantity of or different quantities of second signals.

The preset correspondence between a feature parameter and a supported function of the third signal may also be: if the feature parameter belongs to the first feature parameter set, the base station supports a function in a first function set of the third signal, and if the feature parameter belongs to the second feature parameter set, the base station supports using a function in a second function set of the third signal, where the function in the first function set and the function in the second function set are not completely the same.

The foregoing feature parameter threshold, signal set 1, signal set 2, first function set, second function set, first feature parameter set, and second feature parameter set may be preconfigured by the base station by using signaling or may be preset by the system by using a standard protocol.

For example, the signal set 2 includes fewer signal types than the signal set 1. The signal set 1 or the signal set 2 may be an empty set. The signal set 1 and the signal set 2 may include completely different signals, and in this case, if the base station supports transmission of a signal in the signal set 2, it indicates that the base station does not support transmission of a signal in the signal set 1. The signal set 1 or the signal set 2 includes one or more types of the following signals: a physical downlink control channel, an enhanced physical downlink control channel, a physical random access channel, a physical control format indicator channel, a physical hybrid automatic repeat request indicator channel, a unicast physical downlink shared channel, a broadcast or multicast physical downlink shared channel, a physical uplink shared channel, a physical uplink control channel, a synchronization channel, a physical broadcast channel, a common reference signal, a demodulation reference signal, a dedicated reference signal, a random access response message, a random access response acknowledgment message, a contention resolution message, system information, and a paging message.

In addition, the first function set includes a larger quantity of functions than the second function set. Specifically, for example, the third signal is a PUCCH, and the first function set and the second function set include one or more of the following functions: a function of reporting channel quality information, a scheduling request function, and a function of feeding back an acknowledgement indicating whether a signal is correctly received; however, the second function set includes a smaller quantity of functions than the first function set.

After determining the feature parameter of the UE, the base station may determine, according to the preset correspondence between a feature parameter and a coverage enhancement technology that is used to transmit the first signal, a coverage enhancement technology that is used to transmit the first signal and that corresponds to the feature parameter of the UE; and/or the base station determines, according to the preset correspondence between a feature parameter and a second signal of which transmission is supported, a second signal to which the feature parameter of the UE corresponds, wherein transmission of the second signal is supported by the feature parameter; and/or the base station determines, according to the preset correspondence between a feature parameter and a supported function of the third signal, a supported function that is corresponding to the feature parameter of the UE and is of the third signal.

The first signal, the second signal, and the third signal herein may be the same or may be different. That is, the first signal and the second signal may be the same or may be different; the first signal and the third signal may be the same or may be different; and the second signal and the third signal may be the same or may be different.

The first signal, the second signal, or the third signal includes at least one of the following:

a physical downlink control channel, an enhanced physical downlink control channel, a physical random access channel, a physical control format indicator channel, a physical hybrid automatic repeat request indicator channel, a unicast physical downlink shared channel, a broadcast or multicast physical downlink shared channel, a physical uplink shared channel, a physical uplink control channel, a synchronization channel, a physical broadcast channel, a common reference signal, a demodulation reference signal, a dedicated reference signal, a random access response message, a random access response acknowledgment message, a contention resolution message, system information, and a paging message.

By using an example in which the feature parameter of the UE is a coverage enhancement value, the following describes determining, by the base station according to the feature parameter of the UE and the preset correspondence, the coverage enhancement technology used by the base station to transmit the first signal, and/or determining the second signal that the base station supports transmitting, and/or determining the function, supported by the base station, of the third signal.

For example, the preset correspondence, specified by the base station or the system in advance, between a feature parameter and a coverage enhancement technology that is used to transmit the first signal is: when a coverage enhancement value is X dB (or is greater than 0 dB and less than or equal to X dB), a first coverage enhancement technology is used to transmit the first signal; when the coverage enhancement value is Y dB (or is greater than X dB, or is greater than X dB and less than or equal to Y dB), a second coverage enhancement technology is used to transmit the first signal. Herein, X and/or Y are/is a predefined feature threshold.

If the base station determines that a coverage enhancement value of UE is X dB (or is greater than 0 dB and less than or equal to X dB), the base station determines, according to the correspondence between a feature parameter and a coverage enhancement technology that is used to transmit the first signal, that the first coverage enhancement technology is used to transmit the first signal during communication with the UE. If the base station determines that the coverage enhancement value of the UE is Y dB (or is greater than X dB, or is greater than X dB and less than or equal to Y dB), the base station determines, according to the correspondence between a feature parameter and a coverage enhancement technology that is used to transmit the first signal, that the second coverage enhancement technology is used to transmit the first signal during communication with the UE.

In this embodiment, the first coverage enhancement technology and the second coverage enhancement technology may be one of or a combination of multiple of the following technologies: retransmission, spread spectrum transmission, low bit-rate transmission, transmission time interval bundling (TTI bundling) transmission, power boosting (power boosting), power spectrum density boosting (PSD boosting), keep trying (keep trying), relaxing requirement, frequency hopping, and maximum likelihood detection.

More specifically, for example, the first signal is a physical uplink control channel PUCCH, and the base station or the system specifies in advance: when a coverage enhancement value is greater than 0 dB and less than or equal to X dB, the relaxing requirement (and/or frequency hopping) is used to perform PUCCH coverage enhancement; when the coverage enhancement value is greater than X dB and less than or equal to Y dB (or is greater than X dB), the relaxing requirement (and/or frequency hopping) and repeated transmission are used to perform PUCCH coverage enhancement. Herein, X and/or Y are/is a predefined feature parameter threshold. For example, it is specified in advance that X=5, and Y=10. If the base station determines that a coverage enhancement value of UE 1 is 3 dB, the base station determines that the coverage enhancement value of the UE 1 is less than 5 dB, and therefore, the base station determines that relaxing requirement (and/or frequency hopping) is used to perform PUCCH coverage enhancement for the PUCCH, and the base station correspondingly receives the PUCCH in this manner. If the base station determines that a coverage enhancement value of UE 2 is 8 dB, the base station determines that the coverage enhancement value of the UE 2 is greater than 5 dB and less than 10 dB (or is greater than 5 dB), and therefore, the base station determines that relaxing requirement (and/or frequency hopping) and repeated transmission are used to perform PUCCH coverage enhancement for the PUCCH, and the base station correspondingly receives the PUCCH in this manner.

Specifically, for another example, the first signal is a physical broadcast channel PBCH, and the base station or the system specifies in advance: when a coverage enhancement value is not greater than C dB, keep trying is used to perform PBCH coverage enhancement; when the coverage enhancement value is not greater than D dB, keep trying and retransmission are used to perform PBCH coverage enhancement. Herein, C and/or D are/is a predefined feature parameter threshold. For example, it is specified in advance that C=10, and D=15. If the base station determines that a current coverage enhancement value of UE (one UE or multiple UEs) is not greater than 10 dB, the base station determines that keep trying is used to perform PBCH coverage enhancement for the PBCH. If the base station determines that a current coverage enhancement value of UE (one UE or multiple UEs) is not greater than 15 dB, the base station determines that keep trying and retransmission are used to perform PBCH coverage enhancement for the PBCH.

For example, the preset correspondence, specified by the base station or the system in advance, between a feature parameter and a second signal of which transmission is supported is: when a coverage enhancement value is X dB (or is greater than 0 dB and less than or equal to X dB), the base station supports transmitting a second signal in a signal set 1; when the coverage enhancement value is Y dB (or is greater than X dB, or is greater than X dB and less than or equal to Y dB), the base station supports transmitting a second signal in a signal set 2. Herein, X and/or Y are/is a predefined feature threshold.

If the base station determines that a coverage enhancement value of UE is X dB (or is greater than 0 dB and less than or equal to X dB), the base station determines, according to the correspondence between a feature parameter and a second signal of which transmission is supported, that transmission of the second signal in the signal set 1 is supported during communication with the UE. If the base station determines that the coverage enhancement value of the UE is Y dB (or is greater than X dB, or is greater than X dB and less than or equal to Y dB), the base station determines, according to the correspondence between a feature parameter and a second signal of which transmission is supported, that transmission of the second signal in the signal set 2 is supported during communication with the UE.

More specifically, for example, the second signal in the transmission signal set 1 is a PBCH and a physical hybrid automatic repeat request indicator channel PHICH, and the second signal in the signal set 2 is a PBCH. The base station or the system specifies in advance: when a coverage enhancement value is greater than 0 dB and less than or equal to X dB, transmission of the second signal in the transmission signal set 1 is supported; when the coverage enhancement value is greater than X dB and less than or equal to Y dB (or is greater than X dB), transmission of the second signal in the signal set 2 is supported. Herein, X and/or Y are/is a predefined feature parameter threshold. For example, it is specified in advance that X=5, and Y=10. If a coverage enhancement value of UE 1 is 3 dB, the base station determines that the coverage enhancement value of the UE 1 is less than 5 dB, and therefore, the base station determines that the PBCH and the PHICH can be supported during communication with the UE 1. If the base station determines that a coverage enhancement value of UE 2 is 8 dB, the base station determines that the coverage enhancement value of the UE 2 is greater than 5 dB and less than 10 dB, and the base station determines that the PBCH is supported during communication with the UE 2, that is, it is determined that the PHICH is not supported during communication with the UE 2.

Specifically, for another example, the second signal in the transmission signal set 1 is a PUCCH (or a PHICH), and the second signal in the transmission signal set 2 is a null signal, that is, the transmission signal set 2 does not include any signal. The base station or the system specifies in advance: when a coverage enhancement value is greater than 0 dB and less than or equal to X dB, transmission of the second signal in the signal set 1 is supported; when the coverage enhancement value is greater than X dB and less than or equal to Y dB (or is greater than X dB), transmission of the second signal in the signal set 2 is supported. Herein, X and/or Y are/is a predefined feature parameter threshold. For example, it is specified in advance that X=5, and Y=10. If the base station determines that a coverage enhancement value of UE 1 is 3 dB, the base station determines that the coverage enhancement value of the UE 1 is less than 5 dB, and therefore, the base station determines that the PUCCH (or the PHICH) can be supported during communication with the UE 1. If the base station determines that the coverage enhancement value of the UE 1 is 8 dB, the base station determines that the coverage enhancement value of the UE 1 is greater than 5 dB and less than 10 dB (or is greater than 5 dB), and the base station determines that transmission of the signal in the signal set 1 is not supported during communication with the UE 1, that is, the PUCCH (or the PHICH) is not supported during communication between the base station and the UE 1.

For example, the preset correspondence, specified by the base station or the system in advance, between a feature parameter and a supported function of the third signal is: when a coverage enhancement value is X dB (or is greater than 0 dB and less than or equal to X dB), the base station supports a function in a first function set of the third signal; when the coverage enhancement value is Y dB (or is greater than X dB, or is greater than X dB and less than or equal to Y dB), the base station supports a function in a second function of the third signal. Herein, X and/or Y are/is a predefined feature threshold.

If the base station determines that a coverage enhancement value of UE is X dB (or is greater than 0 dB and less than or equal to X dB), the base station determines, according to the correspondence between a feature parameter and a supported function of the third signal, that the function in the first function set of the third signal is supported. If the base station determines that the coverage enhancement value of the UE is Y dB (or is greater than X dB, or is greater than X dB and less than or equal to Y dB), the base station determines, according to the correspondence between a feature parameter and a supported function of the third signal, that the function in the second function set of the third signal is supported.

More specifically, for example, the third signal is a PUCCH. The base station or the system specifies in advance that functions in a first function set of the PUCCH include a function of reporting channel quality information, a scheduling request function, and a function of feeding back an acknowledgement indicating whether a signal is correctly received; functions in a second function set of the PUCCH include a scheduling request function, and a function of feeding back an acknowledgement indicating whether a signal is correctly received. Besides, the base station or the system specifies in advance: when a coverage enhancement value is greater than 0 dB and less than or equal to X dB, the functions in the first function set of the third signal are supported; when the coverage enhancement value is greater than X dB and less than or equal to Y dB (or is greater than X dB), the functions in the second function set of the third signal are supported. Herein, X and/or Y are/is a predefined feature parameter threshold. For example, it is specified in advance that X=5, and Y=10. If the base station determines that a coverage enhancement value of UE 1 is 3 dB, the base station determines that the coverage enhancement value of UE 1 is less than 5 dB, and therefore, the base station determines that the following functions of the PUCCH are supported during communication with the UE 1: the function of reporting channel quality information, the scheduling request function, and the function of feeding back an acknowledgement indicating whether a signal is correctly received. If the base station determines that the coverage enhancement value of the UE 1 is 8 dB, the base station determines that the coverage enhancement value of the UE 1 is greater than 5 dB and less than 10 dB (or is greater than 5 dB), and the base station determines that the scheduling request function and the function of feeding back an acknowledgement indicating whether a signal is correctly received of the PUCCH are supported during communication with the UE 1.

It should be noted that the foregoing description of method implementation of this embodiment is provided by using an example in which the feature parameter is a coverage enhancement value. When the feature parameter is a level, a level index, a quantity of repetition times, an index of a quantity of repetition times, a resource, a resource index, an enhancement level, an enhancement level index, or other information (which reflects communication quality, channel quality, or a service feature), implementation of this embodiment may be performed similarly according to the foregoing description, and details are not described herein again.

The "transmission" in this embodiment refers to sending or receiving. The "transmit" in this embodiment refers to send or receive.

In this embodiment, according to a current feature parameter of UE and a preset correspondence, a base station may adaptively determine a coverage enhancement technology used to transmit a first signal between the UE and the base station, and/or determine a second signal of which transmission is supported between the UE and the base station, and/or determine a supported function of a third signal, thereby adapting to different feature parameters of the UE, so as to optimize resource utilization of a system, decrease processing complexity, and reduce power consumption.

In addition, it should be noted that the described apparatus embodiment is merely exemplary. The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments. In addition, in the accompanying drawings of the apparatus embodiments provided by the present invention, connection relationships between the units indicate that the units have communication connections with each other, which may be specifically implemented as one or more communications buses or signal cables. A person of ordinary skill in the art may understand and implement the embodiments of the present invention without creative efforts.

Based on the description of the foregoing implementation manners, a person skilled in the art may clearly understand that the present invention may be implemented by software in addition to necessary universal hardware, or by dedicated hardware, including an application-specific integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be of various forms, for example, in a form of an analog circuit, a digital circuit, a dedicated circuit, or the like. However, as for the present invention, software program implementation is a better implementation manner in most cases. Based on such an understanding, the technical solutions of the present invention essentially or the part contributing to the prior art may be implemented in a form of a software product. The computer software product is stored in a readable storage medium, such as a floppy disk, a USB flash drive, a removable hard disk, a read-only memory (ROM, Read-Only Memory), a random access memory (RAM, Random Access Memory), a magnetic disk, or an optical disc of a computer, and includes several instructions for instructing a computer device (which may be a personal computer, a server, a network device, and the like) to perform the methods described in the embodiments of the present invention.

A signal transmission method, user equipment, and a base station provided by the embodiments of the present invention are described in detail above. A person of ordinary skill in the art may, based on the idea of the embodiments of the present invention, make modifications with respect to the specific implementation manners and the application scope. Therefore, the content of this specification shall not be construed as a limitation to the present invention.

What is claimed is:

1. A user equipment (UE) comprising:
   a memory storing a preset correspondence and a program; and
   a processor for executing the program, the program comprising instructions for:
      determining a feature parameter of the UE, wherein the feature parameter of the UE comprises at least one of the following:
         an enhancement level, an enhancement level index, an index of a coverage enhancement range, and an index of a reference signal received power range; and
      determining, according to a preset correspondence between the feature parameter and a supported function of a physical uplink control channel (PUCCH), the supported function corresponding to the feature parameter of the UE, wherein
   the preset correspondence between the feature parameter and the supported function of the PUCCH is:
      in response to determining that the feature parameter belongs to a first feature parameter set, the UE supports a function in a first function set of the PUCCH, and
      in response to determining that the feature parameter belongs to a second feature Parameter set, the UE supports using a function in a second function set of the PUCCH,
   wherein the function in the first function set and the function in the second function set are not completely the same.

2. The UE according to claim 1,
   wherein functions in a first function set of the PUCCH includes: a function of reporting channel quality information, a scheduling request function, and a function of feeding back an acknowledgement indicating whether a signal is correctly received; and
   wherein functions in a second function set of PUCCH includes: a scheduling request function, and a function of feeding back an acknowledgement indicating whether a signal is correctly received.

3. The UE according to claim 1, wherein the preset correspondence is a preset function relationship, a preset table relationship, or a preset specification relationship, and the preset correspondence is preconfigured by a base station by using signaling or is preset by a system.

4. A base station comprising:
   a processor;
   a memory storing a program to be executed in the process, the memory storing a preset correspondence, the program comprising instructions for:
      determining a feature parameter of user equipment (UE), wherein the feature parameter of the UE comprises at least one of the following:
      an enhancement level, an enhancement level index, an index of a coverage enhancement range, and an index of a reference signal received power range; and
      determining, according to the preset correspondence between the feature parameter and a supported function of a physical uplink control channel (PUCCH), the supported function of the PUCCH, which is corresponding to the feature parameter of the UE, wherein the preset correspondence between the feature parameter and a supported function of the PUCCH is:
         in response to determining that the feature parameter belongs to a first feature parameter set, the UE supports a function in a first function set of the PUCCH, and
         in response to determining that the feature parameter belongs to a second feature Parameter set, the UE supports using a function in a second function set of the PUCCH,
      wherein the function in the first function set and the function in the second function set are not completely the same.

5. The base station according to claim 4,
wherein functions in a first function set of the PUCCH includes: a function of reporting channel quality information, a scheduling request function, and a function of feeding back an acknowledgement indicating whether a signal is correctly received; and
wherein functions in a second function set of PUCCH includes: a scheduling request function, and a function of feeding back an acknowledgement indicating whether a signal is correctly received.

6. The base station according to claim 4, wherein the preset correspondence is a preset function relationship, a preset table relationship, or a preset specification relationship, and the preset correspondence is preconfigured by the base station by using signaling or is preset by a system.

7. A signal transmission method, comprising:
determining, by user equipment (UE), a feature parameter of the UE, wherein the feature parameter of the UE comprises at least one of the following: an enhancement level, an enhancement level index, an index of a coverage enhancement range, and an index of a reference signal received power range; and
determining, according to a preset correspondence between the feature parameter and a supported function of a physical uplink control channel (PUCCH), the supported function of the PUCCH corresponding to the feature parameter of the UE, wherein the preset correspondence between the feature parameter and a supported function of the PUCCH is:
in response to determining that the feature parameter belongs to a first feature parameter set, the UE supports a function in a first function set of the PUCCH, and
in response to determining that the feature parameter belongs to a second feature parameter set, the UE supports using a function in a second function set of the PUCCH,
wherein the function in the first function set and the function in the second function set are not completely the same.

8. The method according to claim 7, wherein the preset correspondence is a preset function relationship, a preset table relationship, or a preset specification relationship, and the preset correspondence is preconfigured by a base station by using signaling or is preset by a system.

9. The method according to claim 7, wherein functions in a first function set of the PUCCH includes: a function of reporting channel quality information, a scheduling request function, and a function of feeding back an acknowledgement indicating whether a signal is correctly received; and
wherein functions in a second function set of PUCCH includes: a scheduling request function, and a function of feeding back an acknowledgement indicating whether a signal is correctly received.

10. A signal transmission method comprising:
determining, by a base station, a feature parameter of user equipment (UE), wherein the feature parameter of the UE comprises at least one of the following:
an enhancement level, an enhancement level index, an index of a coverage enhancement range, and an index of a reference signal received power range; and
determining, according to a preset correspondence between the feature parameter and a supported function of a physical uplink control channel (PUCCH), the supported function of the PUCCH, which is corresponding to the feature parameter of the UE, wherein the preset correspondence between the feature parameter and a supported function of the PUCCH is:
in response to determining that the feature parameter belongs to a first feature parameter set, the UE supports a function in a first function set of the PUCCH, and
in response to determining that the feature parameter belongs to a second feature Parameter set, the UE supports using a function in a second function set of the PUCCH,
wherein the function in the first function set and the function in the second function set are not completely the same.

11. The method according to claim 10, wherein the preset correspondence is a preset function relationship, a preset table relationship, or a preset specification relationship, and the preset correspondence is preconfigured by a base station by using signaling or is preset by a system.

12. The method according to claim 10, wherein functions in a first function set of the PUCCH includes: a function of reporting channel quality information, a scheduling request function, and a function of feeding back an acknowledgement indicating whether a signal is correctly received; and
wherein functions in a second function set of PUCCH includes: a scheduling request function, and a function of feeding back an acknowledgement indicating whether a signal is correctly received.

* * * * *

UNITED STATES PATENT AND TRADEMARK OFFICE
CERTIFICATE OF CORRECTION

PATENT NO. : 10,182,444 B2
APPLICATION NO. : 15/160988
DATED : January 15, 2019
INVENTOR(S) : Zheng Yu et al.

Page 1 of 1

It is certified that error appears in the above-identified patent and that said Letters Patent is hereby corrected as shown below:

In the Claims

In Column 62, Line 16, Claim 1, delete "Parameter" and insert --parameter--.

In Column 62, Line 62, Claim 4, delete "Parameter" and insert --parameter--.

In Column 64, Line 27, Claim 10, delete "Parameter" and insert --parameter--.

Signed and Sealed this
Second Day of April, 2019

Andrei Iancu
*Director of the United States Patent and Trademark Office*